United States Patent
Epler

(10) Patent No.: US 9,551,788 B2
(45) Date of Patent: Jan. 24, 2017

(54) FLEET PAN TO PROVIDE MEASUREMENT AND LOCATION OF A STORED TRANSPORT ITEM WHILE MAXIMIZING SPACE IN AN INTERIOR CAVITY OF A TRAILER

(71) Applicant: Jim Epler, Irvine, CA (US)

(72) Inventor: Jim Epler, Irvine, CA (US)

( * ) Notice: Subject to any disclaimer, the term of this patent is extended or adjusted under 35 U.S.C. 154(b) by 0 days.

(21) Appl. No.: 14/666,318

(22) Filed: Mar. 24, 2015

(65) Prior Publication Data

US 2016/0282466 A1  Sep. 29, 2016

(51) Int. Cl.
| | |
|---|---|
| *G01S 15/02* | (2006.01) |
| *B62D 53/06* | (2006.01) |
| *B60R 11/02* | (2006.01) |
| *G01S 19/35* | (2010.01) |
| *G01S 19/14* | (2010.01) |
| *B60R 11/00* | (2006.01) |

(52) U.S. Cl.
CPC .......... *G01S 15/025* (2013.01); *B60R 11/0258* (2013.01); *B62D 53/06* (2013.01); *G01S 19/14* (2013.01); *G01S 19/35* (2013.01); *B60R 2011/0036* (2013.01); *B60R 2011/0294* (2013.01)

(58) Field of Classification Search
CPC ........ G01S 15/025; G01S 19/14; G01S 19/35; B60R 11/0258; B62D 53/06
See application file for complete search history.

(56) References Cited

U.S. PATENT DOCUMENTS

| | | | |
|---|---|---|---|
| 4,067,061 | A | 1/1978 | Juhasz |
| 4,633,407 | A | 12/1986 | Freienstein et al. |
| 4,654,821 | A | 3/1987 | Lapp |
| 4,663,725 | A | 5/1987 | Truckenbrod et al. |
| 4,675,539 | A | 6/1987 | Nichol |
| 4,695,946 | A | 9/1987 | Andreasen et al. |
| 4,701,845 | A | 10/1987 | Andreasen et al. |

(Continued)

FOREIGN PATENT DOCUMENTS

| | | |
|---|---|---|
| CA | 2609106 A1 | 10/2008 |
| CA | 2688263 A1 | 12/2008 |

(Continued)

OTHER PUBLICATIONS

"Affix" defintion, Google.com,retrieved Apr. 26, 2016.*

(Continued)

*Primary Examiner* — Calvin Cheung
(74) *Attorney, Agent, or Firm* — Raj Abhyanker, P.C.

(57) ABSTRACT

A trailer of a semi-trailer truck includes a cargo container having affixed at a height of approximately forty-six inches from a base of the cargo container a hole that is approximately two and one half inches in diameter. A fleet pan enclosure in a form of a housing encompassing a communications circuitry, a global positioning device and an ultrasound sensor projects into an interior cavity of the cargo container through the hole. The global positioning device provides an accurate reporting of a location of the semi-trailer truck to a central server. An antenna of a communication circuitry is fully encompassed within the housing. The location at which the housing is affixed provides for an effective measuring and reliable locating of a stored transport item inside the interior cavity of the cargo container through the hole.

17 Claims, 9 Drawing Sheets

(56) References Cited

U.S. PATENT DOCUMENTS

| | | |
|---|---|---|
| 4,727,360 A | 2/1988 | Ferguson et al. |
| 4,837,700 A | 6/1989 | Ando et al. |
| 4,884,242 A | 11/1989 | Lacy et al. |
| 4,891,650 A | 1/1990 | Sheffer |
| 4,907,150 A | 3/1990 | Arroyo et al. |
| 5,119,301 A | 6/1992 | Shimizu et al. |
| 5,122,959 A | 6/1992 | Nathanson et al. |
| 5,208,756 A | 5/1993 | Song |
| 5,218,367 A | 6/1993 | Sheffer et al. |
| 5,223,844 A | 6/1993 | Mansell et al. |
| 5,276,865 A | 1/1994 | Thorpe |
| 5,289,369 A | 2/1994 | Hirshberg |
| 5,299,132 A | 3/1994 | Wortham |
| 5,307,277 A | 4/1994 | Hirano |
| 5,390,125 A | 2/1995 | Sennott et al. |
| 5,408,411 A | 4/1995 | Nakamura et al. |
| 5,424,952 A | 6/1995 | Asayama |
| 5,457,439 A | 10/1995 | Kuhn |
| 5,515,419 A | 5/1996 | Sheffer |
| 5,521,579 A | 5/1996 | Bernhard |
| 5,610,815 A | 3/1997 | Gudat et al. |
| 5,684,474 A | 11/1997 | Gilon et al. |
| 5,686,888 A | 11/1997 | Welles, II et al. |
| 5,708,820 A | 1/1998 | Park et al. |
| 5,712,789 A | 1/1998 | Radican |
| 5,751,245 A | 5/1998 | Janky et al. |
| 5,805,103 A | 9/1998 | Doi et al. |
| 5,867,804 A | 2/1999 | Pilley et al. |
| 5,870,029 A | 2/1999 | Otto et al. |
| 5,877,956 A | 3/1999 | Frank et al. |
| 5,917,433 A | 6/1999 | Keillor et al. |
| 5,923,243 A | 7/1999 | Bleiner |
| 5,949,974 A | 9/1999 | Ewing et al. |
| 5,978,236 A | 11/1999 | Faberman et al. |
| 6,029,111 A | 2/2000 | Croyle |
| 6,067,044 A | 5/2000 | Whelan et al. |
| 6,075,441 A | 6/2000 | Maloney |
| 6,091,323 A | 7/2000 | Kawai |
| 6,148,291 A | 11/2000 | Radican |
| 6,154,152 A | 11/2000 | Ito |
| 6,181,029 B1 | 1/2001 | Berglund et al. |
| 6,202,023 B1 | 3/2001 | Hancock et al. |
| 6,204,764 B1 | 3/2001 | Maloney |
| 6,226,389 B1 | 5/2001 | Lemelson et al. |
| 6,233,563 B1 | 5/2001 | Jefferson et al. |
| 6,240,365 B1 | 5/2001 | Bunn |
| 6,249,217 B1 | 6/2001 | Forbes |
| 6,266,008 B1 | 7/2001 | Huston et al. |
| 6,275,773 B1 | 8/2001 | Lemelson et al. |
| 6,317,693 B2 | 11/2001 | Kodaka et al. |
| 6,338,011 B1 | 1/2002 | Furst et al. |
| 6,339,369 B1 | 1/2002 | Paranjpe |
| 6,339,745 B1 | 1/2002 | Novik |
| 6,363,320 B1 | 3/2002 | Chou |
| 6,385,539 B1 | 5/2002 | Wilson et al. |
| 6,388,580 B1 | 5/2002 | Graham |
| 6,393,582 B1 | 5/2002 | Klecka et al. |
| 6,393,584 B1 | 5/2002 | McLaren et al. |
| 6,394,480 B1 * | 5/2002 | Brennan ............ B62D 53/085 280/432 |
| 6,415,227 B1 | 7/2002 | Lin |
| 6,483,434 B1 | 11/2002 | Umiker |
| 6,502,080 B1 | 12/2002 | Eichorst et al. |
| 6,510,381 B2 | 1/2003 | Grounds et al. |
| 6,512,465 B2 | 1/2003 | Flick |
| 6,577,921 B1 | 6/2003 | Carson |
| 6,584,403 B2 | 6/2003 | Bunn |
| 6,701,234 B1 | 3/2004 | Vogelsang |
| 6,704,810 B1 | 3/2004 | Krehbiel, Jr. et al. |
| 6,714,857 B2 | 3/2004 | Kapolka et al. |
| 6,717,527 B2 | 4/2004 | Simon |
| 6,720,920 B2 | 4/2004 | Breed et al. |
| 6,737,963 B2 | 5/2004 | Gutta et al. |
| 6,748,320 B2 | 6/2004 | Jones |
| 6,771,970 B1 | 8/2004 | Dan |
| 6,816,090 B2 | 11/2004 | Teckchandani et al. |
| 6,832,153 B2 | 12/2004 | Thayer et al. |
| 6,844,827 B2 | 1/2005 | Flick |
| 6,856,902 B1 | 2/2005 | Mitchem |
| 6,871,137 B2 | 3/2005 | Scaer et al. |
| 6,873,963 B1 | 3/2005 | Westbury et al. |
| 6,904,359 B2 | 6/2005 | Jones |
| 6,930,638 B2 | 8/2005 | Lloyd et al. |
| 6,931,309 B2 | 8/2005 | Phelan et al. |
| 6,985,087 B2 | 1/2006 | Soliman |
| 7,015,824 B2 * | 3/2006 | Cleveland .......... G01S 7/52006 340/686.1 |
| 7,035,856 B1 | 4/2006 | Morimoto |
| 7,039,520 B2 | 5/2006 | Draeger et al. |
| 7,065,445 B2 | 6/2006 | Thayer et al. |
| 7,072,764 B2 | 7/2006 | Donath et al. |
| 7,091,835 B2 | 8/2006 | Boulay et al. |
| 7,096,392 B2 | 8/2006 | Sim-Tang |
| 7,099,934 B1 | 8/2006 | Ewing et al. |
| 7,154,390 B2 | 12/2006 | Giermanski et al. |
| 7,170,390 B2 | 1/2007 | Quinones et al. |
| 7,174,243 B1 | 2/2007 | Lightner et al. |
| 7,177,738 B2 | 2/2007 | Diaz |
| 7,212,134 B2 | 5/2007 | Taylor |
| 7,215,255 B2 | 5/2007 | Grush |
| 7,242,303 B2 | 7/2007 | Patel et al. |
| 7,253,731 B2 | 8/2007 | Joao |
| 7,266,378 B2 | 9/2007 | Norta et al. |
| 7,283,046 B2 | 10/2007 | Culpepper et al. |
| 7,289,019 B1 | 10/2007 | Kertes |
| 7,302,344 B2 | 11/2007 | Olney et al. |
| 7,308,611 B2 | 12/2007 | Booth |
| 7,327,238 B2 | 2/2008 | Bhogal et al. |
| 7,339,469 B2 | 3/2008 | Braun |
| 7,343,306 B1 | 3/2008 | Bates et al. |
| 7,346,439 B2 | 3/2008 | Bodin |
| 7,346,790 B1 | 3/2008 | Klein |
| 7,405,658 B2 | 7/2008 | Richards |
| 7,446,649 B2 | 11/2008 | Bhogal et al. |
| 7,455,225 B1 | 11/2008 | Hadfield et al. |
| 7,467,325 B2 | 12/2008 | Eisen et al. |
| 7,472,202 B2 | 12/2008 | Parupudi et al. |
| 7,479,877 B2 | 1/2009 | Mortenson et al. |
| 7,486,176 B2 | 2/2009 | Bhogal et al. |
| 7,489,993 B2 | 2/2009 | Coffee et al. |
| 7,527,288 B2 | 5/2009 | Breed |
| 7,552,008 B2 | 6/2009 | Newstrom et al. |
| 7,555,370 B2 | 6/2009 | Breed et al. |
| 7,571,051 B1 | 8/2009 | Shulman |
| 7,574,195 B2 | 8/2009 | Krasner et al. |
| 7,580,782 B2 | 8/2009 | Breed et al. |
| 7,593,999 B2 | 9/2009 | Nathanson |
| 7,600,150 B2 | 10/2009 | Wu |
| 7,617,037 B2 | 11/2009 | Desens et al. |
| 7,650,210 B2 | 1/2010 | Breed |
| 7,652,568 B2 | 1/2010 | Waugh et al. |
| 7,657,354 B2 | 2/2010 | Breed et al. |
| 7,668,931 B2 | 2/2010 | Parupudi et al. |
| 7,672,756 B2 | 3/2010 | Breed |
| 7,693,626 B2 | 4/2010 | Breed et al. |
| 7,701,363 B1 | 4/2010 | Zlojutro |
| 7,725,216 B2 | 5/2010 | Kim |
| 7,746,228 B2 | 6/2010 | Sensenig et al. |
| 7,751,944 B2 | 7/2010 | Parupudi et al. |
| 7,755,541 B2 | 7/2010 | Wisherd et al. |
| 7,769,499 B2 | 8/2010 | McQuade et al. |
| 7,774,633 B1 | 8/2010 | Harrenstien et al. |
| 7,817,033 B2 | 10/2010 | Motoyama |
| 7,876,239 B2 | 1/2011 | Horstemeyer |
| 7,893,818 B2 | 2/2011 | Smoyer et al. |
| 7,899,591 B2 | 3/2011 | Shah et al. |
| 7,899,621 B2 | 3/2011 | Breed et al. |
| 7,916,026 B2 | 3/2011 | Johnson et al. |
| 7,950,570 B2 | 5/2011 | Marchasin et al. |
| 7,971,095 B2 | 6/2011 | Hess et al. |
| 7,987,017 B2 | 7/2011 | Buzzoni et al. |
| 8,009,034 B2 | 8/2011 | Dobson et al. |
| 8,009,086 B2 | 8/2011 | Grossnickle et al. |
| 8,095,304 B2 | 1/2012 | Blanton et al. |

(56) References Cited

U.S. PATENT DOCUMENTS

| | | | |
|---|---|---|---|
| 8,103,450 B2 | 1/2012 | Takaoka |
| 8,103,741 B2 | 1/2012 | Frazier et al. |
| 8,106,757 B2 | 1/2012 | Brinton et al. |
| 8,111,154 B1 | 2/2012 | Puri et al. |
| 8,126,601 B2 | 2/2012 | Kapp et al. |
| 8,181,868 B2 | 5/2012 | Thomas et al. |
| 8,185,767 B2 | 5/2012 | Ballou et al. |
| 8,201,009 B2 | 6/2012 | Sun et al. |
| 8,237,591 B2 | 8/2012 | Holcomb et al. |
| 8,255,144 B2 | 8/2012 | Breed et al. |
| 8,279,067 B2 | 10/2012 | Berger et al. |
| 8,299,920 B2 | 10/2012 | Hamm et al. |
| 8,306,687 B2 | 11/2012 | Chen |
| 8,311,858 B2 | 11/2012 | Everett et al. |
| 8,326,813 B2 | 12/2012 | Nizami et al. |
| 8,330,626 B1 | 12/2012 | Adelson |
| 8,330,817 B1 | 12/2012 | Foster |
| 8,368,561 B2 | 2/2013 | Welch et al. |
| 8,380,426 B2 | 2/2013 | Konijnendijk |
| 8,398,405 B2 | 3/2013 | Kumar |
| 8,407,139 B1 | 3/2013 | Palmer |
| 8,452,771 B2 | 5/2013 | Kurciska et al. |
| 8,462,021 B2 | 6/2013 | Welch et al. |
| 8,467,324 B2 | 6/2013 | Yousefi et al. |
| 8,489,907 B2 | 7/2013 | Wakrat et al. |
| 8,502,661 B2 | 8/2013 | Mauro et al. |
| 8,504,233 B1 | 8/2013 | Ferguson et al. |
| 8,504,512 B2 | 8/2013 | Herzog et al. |
| 8,510,200 B2 | 8/2013 | Pearlman et al. |
| 8,527,135 B2 | 9/2013 | Lowrey et al. |
| 8,565,963 B2 | 10/2013 | Burke, Jr. |
| 8,587,430 B2 | 11/2013 | Ferguson et al. |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,655,983 B1 | 2/2014 | Harris et al. |
| 8,671,063 B2 | 3/2014 | Ehrman et al. |
| 8,700,249 B1 | 4/2014 | Carrithers |
| 8,718,536 B2 | 5/2014 | Hannon |
| 8,725,326 B2 | 5/2014 | Kapp et al. |
| 8,725,342 B2 | 5/2014 | Ferguson et al. |
| 8,762,009 B2 | 6/2014 | Ehrman et al. |
| 8,766,797 B2 | 7/2014 | Hamm et al. |
| 8,770,480 B2 | 7/2014 | Gulli |
| 8,781,169 B2 | 7/2014 | Jackson et al. |
| 8,781,958 B2 | 7/2014 | Michael |
| 8,799,461 B2 | 8/2014 | Herz et al. |
| 8,839,026 B2 | 9/2014 | Kopylovitz |
| 8,933,802 B2 | 1/2015 | Baade |
| 8,970,701 B2 | 3/2015 | Lao |
| 9,049,564 B2 | 6/2015 | Muetzel et al. |
| 2001/0006398 A1 | 7/2001 | Nakamura et al. |
| 2001/0018628 A1 | 8/2001 | Jenkins et al. |
| 2001/0018639 A1 | 8/2001 | Bunn |
| 2001/0034577 A1 | 10/2001 | Grounds et al. |
| 2001/0037298 A1 | 11/2001 | Ehrman et al. |
| 2002/0000916 A1 | 1/2002 | Richards |
| 2002/0014978 A1 | 2/2002 | Flick |
| 2002/0059126 A1 | 5/2002 | Ricciardi |
| 2002/0070891 A1 | 6/2002 | Huston et al. |
| 2002/0082025 A1 | 6/2002 | Baese et al. |
| 2002/0184062 A1 | 12/2002 | Diaz |
| 2002/0186144 A1 | 12/2002 | Meunier |
| 2002/0198632 A1 | 12/2002 | Breed et al. |
| 2003/0009361 A1 | 1/2003 | Hancock et al. |
| 2003/0013146 A1 | 1/2003 | Werb |
| 2003/0018428 A1 | 1/2003 | Knockeart et al. |
| 2003/0023614 A1 | 1/2003 | Newstrom et al. |
| 2003/0055542 A1 | 3/2003 | Knockeart et al. |
| 2003/0055553 A1 | 3/2003 | Knockeart et al. |
| 2003/0083060 A1 | 5/2003 | Menendez |
| 2003/0125855 A1 | 7/2003 | Breed et al. |
| 2003/0151501 A1 | 8/2003 | Teckchandani et al. |
| 2003/0151507 A1 | 8/2003 | Andre et al. |
| 2003/0158638 A1 | 8/2003 | Yakes et al. |
| 2003/0158639 A1 | 8/2003 | Nada |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0174067 A1 | 9/2003 | Soliman |
| 2003/0176959 A1 | 9/2003 | Breed |
| 2003/0191567 A1 | 10/2003 | Gentilcore |
| 2003/0191568 A1 | 10/2003 | Breed |
| 2003/0204407 A1 | 10/2003 | Nabors et al. |
| 2004/0006398 A1 | 1/2004 | Bickford |
| 2004/0006413 A1 | 1/2004 | Kane et al. |
| 2004/0041706 A1* | 3/2004 | Stratmoen .............. G06Q 10/08 340/539.26 |
| 2004/0049337 A1 | 3/2004 | Knockeart et al. |
| 2004/0050076 A1* | 3/2004 | Palfy ....................... A42B 3/24 62/155 |
| 2004/0056797 A1 | 3/2004 | Knockeart et al. |
| 2004/0093291 A1 | 5/2004 | Bodin |
| 2004/0102895 A1 | 5/2004 | Thayer et al. |
| 2004/0102896 A1 | 5/2004 | Thayer et al. |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0199285 A1 | 10/2004 | Berichon et al. |
| 2004/0199302 A1 | 10/2004 | Pillar et al. |
| 2004/0204969 A1 | 10/2004 | Wu |
| 2004/0225557 A1 | 11/2004 | Phelan et al. |
| 2004/0246177 A1 | 12/2004 | Lloyd et al. |
| 2005/0004748 A1 | 1/2005 | Pinto et al. |
| 2005/0007450 A1 | 1/2005 | Hill et al. |
| 2005/0021199 A1 | 1/2005 | Zimmerman et al. |
| 2005/0021722 A1 | 1/2005 | Metzger |
| 2005/0043879 A1 | 2/2005 | Desens et al. |
| 2005/0060069 A1 | 3/2005 | Breed et al. |
| 2005/0080565 A1 | 4/2005 | Olney et al. |
| 2005/0114023 A1 | 5/2005 | Williamson et al. |
| 2005/0131597 A1 | 6/2005 | Raz et al. |
| 2005/0134504 A1 | 6/2005 | Harwood et al. |
| 2005/0149251 A1 | 7/2005 | Donath et al. |
| 2005/0171798 A1 | 8/2005 | Croft et al. |
| 2005/0216294 A1 | 9/2005 | Labow |
| 2005/0237166 A1 | 10/2005 | Chen |
| 2006/0041341 A1 | 2/2006 | Kane et al. |
| 2006/0041342 A1 | 2/2006 | Kane et al. |
| 2006/0052913 A1 | 3/2006 | Kane et al. |
| 2006/0053075 A1 | 3/2006 | Roth et al. |
| 2006/0055561 A1 | 3/2006 | Kamali et al. |
| 2006/0074558 A1 | 4/2006 | Williamson et al. |
| 2006/0087411 A1 | 4/2006 | Chang |
| 2006/0089786 A1 | 4/2006 | Soehren |
| 2006/0109106 A1 | 5/2006 | Braun |
| 2006/0129290 A1 | 6/2006 | Zimmerman et al. |
| 2006/0155427 A1 | 7/2006 | Yang |
| 2006/0155434 A1 | 7/2006 | Kane et al. |
| 2006/0187026 A1 | 8/2006 | Kochis |
| 2006/0253234 A1 | 11/2006 | Kane et al. |
| 2006/0273922 A1 | 12/2006 | Bhogal et al. |
| 2007/0005202 A1 | 1/2007 | Breed |
| 2007/0027726 A1 | 2/2007 | Warren et al. |
| 2007/0057781 A1 | 3/2007 | Breed |
| 2007/0061054 A1 | 3/2007 | Rowe et al. |
| 2007/0061076 A1 | 3/2007 | Shulman |
| 2007/0086624 A1 | 4/2007 | Breed et al. |
| 2007/0087756 A1 | 4/2007 | Hoffberg |
| 2007/0096565 A1 | 5/2007 | Breed et al. |
| 2007/0096899 A1 | 5/2007 | Johnson |
| 2007/0115101 A1 | 5/2007 | Creekbaum et al. |
| 2007/0135984 A1 | 6/2007 | Breed et al. |
| 2007/0139216 A1 | 6/2007 | Breed |
| 2007/0156317 A1 | 7/2007 | Breed |
| 2007/0159354 A1 | 7/2007 | Rosenberg |
| 2007/0162550 A1 | 7/2007 | Rosenberg |
| 2007/0167147 A1 | 7/2007 | Krasner et al. |
| 2007/0185625 A1 | 8/2007 | Pillar et al. |
| 2007/0192117 A1* | 8/2007 | Alvarez ................. G06Q 10/08 705/332 |
| 2007/0200690 A1 | 8/2007 | Bhogal et al. |
| 2007/0239322 A1 | 10/2007 | McQuade et al. |

(56) References Cited

U.S. PATENT DOCUMENTS

| | | |
|---|---|---|
| 2007/0244614 A1 | 10/2007 | Nathanson |
| 2007/0285240 A1 | 12/2007 | Sensenig et al. |
| 2007/0290836 A1 | 12/2007 | Ainsworth et al. |
| 2007/0290923 A1 | 12/2007 | Norta et al. |
| 2008/0015748 A1 | 1/2008 | Nagy |
| 2008/0036187 A1 | 2/2008 | Breed |
| 2008/0040004 A1 | 2/2008 | Breed |
| 2008/0040005 A1 | 2/2008 | Breed |
| 2008/0040023 A1 | 2/2008 | Breed et al. |
| 2008/0040268 A1 | 2/2008 | Corn |
| 2008/0042875 A1 | 2/2008 | Harrington et al. |
| 2008/0046150 A1 | 2/2008 | Breed |
| 2008/0051957 A1 | 2/2008 | Breed et al. |
| 2008/0051995 A1 | 2/2008 | Lokshin et al. |
| 2008/0061953 A1 | 3/2008 | Bhogal et al. |
| 2008/0065291 A1 | 3/2008 | Breed |
| 2008/0077285 A1 | 3/2008 | Kumar et al. |
| 2008/0077326 A1 | 3/2008 | Funk et al. |
| 2008/0091350 A1 | 4/2008 | Smith et al. |
| 2008/0111546 A1 | 5/2008 | Takahashi et al. |
| 2008/0119993 A1 | 5/2008 | Breed |
| 2008/0147265 A1 | 6/2008 | Breed |
| 2008/0147280 A1 | 6/2008 | Breed |
| 2008/0157510 A1 | 7/2008 | Breed et al. |
| 2008/0162045 A1 | 7/2008 | Lee |
| 2008/0167821 A1 | 7/2008 | Breed |
| 2008/0176537 A1 | 7/2008 | Smoyer et al. |
| 2008/0183344 A1 | 7/2008 | Doyen et al. |
| 2008/0183376 A1 | 7/2008 | Knockeart et al. |
| 2008/0195261 A1 | 8/2008 | Breed |
| 2008/0195432 A1 | 8/2008 | Fell et al. |
| 2008/0215190 A1 | 9/2008 | Pillar et al. |
| 2008/0234933 A1 | 9/2008 | Chowdhary et al. |
| 2008/0235105 A1 | 9/2008 | Payne et al. |
| 2008/0252431 A1 | 10/2008 | Nigam |
| 2008/0262669 A1 | 10/2008 | Smid et al. |
| 2008/0278314 A1 | 11/2008 | Miller et al. |
| 2008/0294302 A1 | 11/2008 | Basir |
| 2008/0303636 A1* | 12/2008 | Chatte .................. G06Q 10/08 340/10.41 |
| 2008/0318547 A1 | 12/2008 | Ballou, Jr. et al. |
| 2009/0033494 A1 | 2/2009 | Malik |
| 2009/0079591 A1 | 3/2009 | Motoyama |
| 2009/0082918 A1 | 3/2009 | Hendrix, Jr. |
| 2009/0112394 A1 | 4/2009 | Lepejian et al. |
| 2009/0138497 A1 | 5/2009 | Zavoli et al. |
| 2009/0140887 A1 | 6/2009 | Breed et al. |
| 2009/0177378 A1 | 7/2009 | Kamalski et al. |
| 2009/0261975 A1 | 10/2009 | Ferguson et al. |
| 2009/0273489 A1 | 11/2009 | Lu |
| 2009/0326808 A1 | 12/2009 | Blanton et al. |
| 2010/0036793 A1 | 2/2010 | Willis et al. |
| 2010/0049669 A1 | 2/2010 | Mazzarolo |
| 2010/0057279 A1 | 3/2010 | Kyllingstad |
| 2010/0057305 A1 | 3/2010 | Breed |
| 2010/0071572 A1 | 3/2010 | Carroll et al. |
| 2010/0076878 A1 | 3/2010 | Burr et al. |
| 2010/0082195 A1 | 4/2010 | Lee et al. |
| 2010/0094482 A1 | 4/2010 | Schofield et al. |
| 2010/0094500 A1 | 4/2010 | Jin |
| 2010/0117868 A1 | 5/2010 | Van Wiemeersch et al. |
| 2010/0127867 A1 | 5/2010 | Chien et al. |
| 2010/0152972 A1 | 6/2010 | Attard et al. |
| 2010/0169009 A1 | 7/2010 | Breed et al. |
| 2010/0174487 A1 | 7/2010 | Soehren |
| 2010/0191412 A1 | 7/2010 | Kim |
| 2010/0207754 A1 | 8/2010 | Shostak et al. |
| 2010/0250411 A1 | 9/2010 | Ogrodski |
| 2010/0265104 A1 | 10/2010 | Zlojutro |
| 2010/0274415 A1 | 10/2010 | Lam |
| 2010/0332080 A1 | 12/2010 | Bae |
| 2010/0332118 A1 | 12/2010 | Geelen et al. |
| 2010/0332363 A1 | 12/2010 | Duddle et al. |
| 2011/0016340 A1 | 1/2011 | Sun et al. |
| 2011/0060496 A1 | 3/2011 | Nielsen et al. |
| 2011/0071750 A1 | 3/2011 | Giovino et al. |
| 2011/0078089 A1 | 3/2011 | Hamm et al. |
| 2011/0090075 A1 | 4/2011 | Armitage et al. |
| 2011/0090399 A1 | 4/2011 | Whitaker et al. |
| 2011/0106337 A1 | 5/2011 | Patel et al. |
| 2011/0137489 A1 | 6/2011 | Gilleland et al. |
| 2011/0140877 A1 | 6/2011 | Gilchrist et al. |
| 2011/0143669 A1 | 6/2011 | Farrell et al. |
| 2011/0166773 A1 | 7/2011 | Raz et al. |
| 2011/0181391 A1 | 7/2011 | Chu |
| 2011/0196580 A1 | 8/2011 | Xu et al. |
| 2011/0221573 A1 | 9/2011 | Huat |
| 2011/0257880 A1 | 10/2011 | Watanabe et al. |
| 2011/0270772 A1 | 11/2011 | Hall et al. |
| 2011/0275388 A1 | 11/2011 | Haney |
| 2012/0019021 A1* | 1/2012 | Alguera Gallego ... B60J 7/1614 296/26.04 |
| 2012/0029818 A1 | 2/2012 | Smith et al. |
| 2012/0041618 A1 | 2/2012 | Sun et al. |
| 2012/0075088 A1 | 3/2012 | Marentes Aguilar |
| 2012/0077475 A1 | 3/2012 | Holcomb et al. |
| 2012/0078497 A1 | 3/2012 | Burke, Jr. |
| 2012/0089328 A1 | 4/2012 | Ellanti et al. |
| 2012/0089686 A1 | 4/2012 | Meister |
| 2012/0106446 A1 | 5/2012 | Yousefi et al. |
| 2012/0106801 A1 | 5/2012 | Jackson |
| 2012/0119935 A1* | 5/2012 | Mohamadi ............. G01S 7/003 342/22 |
| 2012/0123806 A1 | 5/2012 | Schumann, Jr. et al. |
| 2012/0166018 A1 | 6/2012 | Larschan et al. |
| 2012/0191329 A1 | 7/2012 | Roessle et al. |
| 2012/0197484 A1 | 8/2012 | Nath et al. |
| 2012/0218129 A1 | 8/2012 | Burns |
| 2012/0232945 A1 | 9/2012 | Tong |
| 2012/0249326 A1 | 10/2012 | Mostov |
| 2012/0252488 A1 | 10/2012 | Hartmann et al. |
| 2012/0253861 A1 | 10/2012 | Davidson et al. |
| 2012/0268260 A1 | 10/2012 | Miller et al. |
| 2012/0303237 A1 | 11/2012 | Kumar et al. |
| 2012/0306646 A1* | 12/2012 | Walker ................... B60R 25/33 340/539.16 |
| 2012/0323767 A1 | 12/2012 | Michael |
| 2012/0323771 A1 | 12/2012 | Michael |
| 2012/0323772 A1 | 12/2012 | Michael |
| 2013/0031318 A1 | 1/2013 | Chen et al. |
| 2013/0031345 A1 | 1/2013 | Kung |
| 2013/0035827 A1 | 2/2013 | Breed |
| 2013/0057397 A1 | 3/2013 | Cutler et al. |
| 2013/0059607 A1 | 3/2013 | Herz et al. |
| 2013/0061044 A1 | 3/2013 | Pinkus et al. |
| 2013/0066757 A1 | 3/2013 | Lovelace et al. |
| 2013/0069390 A1 | 3/2013 | Foster |
| 2013/0069803 A1* | 3/2013 | McCormick ....... G06Q 10/0833 340/989 |
| 2013/0097458 A1 | 4/2013 | Sekino et al. |
| 2013/0100286 A1 | 4/2013 | Lao |
| 2013/0113637 A1 | 5/2013 | Sin et al. |
| 2013/0131928 A1 | 5/2013 | Bolton et al. |
| 2013/0138251 A1 | 5/2013 | Thogersen et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0159214 A1 | 6/2013 | Boling et al. |
| 2013/0166198 A1 | 6/2013 | Funk et al. |
| 2013/0179034 A1 | 7/2013 | Pryor |
| 2013/0185193 A1 | 7/2013 | Boling et al. |
| 2013/0185221 A1 | 7/2013 | Adams et al. |
| 2013/0218369 A1 | 8/2013 | Yoshihama et al. |
| 2013/0218461 A1 | 8/2013 | Naimark |
| 2013/0222133 A1 | 8/2013 | Schultz et al. |
| 2013/0249713 A1 | 9/2013 | Adelson |
| 2013/0250933 A1 | 9/2013 | Yousefi et al. |
| 2013/0253732 A1 | 9/2013 | Patel et al. |
| 2013/0253734 A1 | 9/2013 | Kaap et al. |
| 2013/0253754 A1 | 9/2013 | Ferguson et al. |
| 2013/0297199 A1 | 11/2013 | Kapp et al. |
| 2013/0302757 A1 | 11/2013 | Pearlman et al. |
| 2013/0311077 A1 | 11/2013 | Ichida |

(56) References Cited

U.S. PATENT DOCUMENTS

| | | |
|---|---|---|
| 2013/0332070 A1 | 12/2013 | Fleizach et al. |
| 2014/0012438 A1 | 1/2014 | Shoppa et al. |
| 2014/0012510 A1 | 1/2014 | Mensinger et al. |
| 2014/0012511 A1 | 1/2014 | Mensinger et al. |
| 2014/0012634 A1 | 1/2014 | Pearlman et al. |
| 2014/0025229 A1 | 1/2014 | Levien et al. |
| 2014/0025230 A1 | 1/2014 | Levien et al. |
| 2014/0025233 A1 | 1/2014 | Levien et al. |
| 2014/0025234 A1 | 1/2014 | Levien et al. |
| 2014/0025235 A1 | 1/2014 | Levien et al. |
| 2014/0025236 A1 | 1/2014 | Levien et al. |
| 2014/0025284 A1 | 1/2014 | Roberts |
| 2014/0036072 A1 | 2/2014 | Lyall et al. |
| 2014/0052366 A1 | 2/2014 | Rothschild |
| 2014/0052605 A1 | 2/2014 | Beerle et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0058805 A1 | 2/2014 | Paesler et al. |
| 2014/0067160 A1 | 3/2014 | Levien et al. |
| 2014/0067167 A1 | 3/2014 | Levien et al. |
| 2014/0074692 A1 | 3/2014 | Beerle et al. |
| 2014/0077285 A1 | 3/2014 | Noda et al. |
| 2014/0077326 A1 | 3/2014 | Koshino et al. |
| 2014/0091350 A1 | 4/2014 | Katsuno et al. |
| 2014/0095061 A1 | 4/2014 | Hyde |
| 2014/0111546 A1 | 4/2014 | Utagawa |
| 2014/0119993 A1 | 5/2014 | Rhodes |
| 2014/0125500 A1 | 5/2014 | Baade |
| 2014/0125501 A1 | 5/2014 | Baade |
| 2014/0129426 A1 | 5/2014 | Lamb et al. |
| 2014/0143169 A1 | 5/2014 | Lozito |
| 2014/0147280 A1 | 5/2014 | Kowatsch |
| 2014/0157510 A1 | 6/2014 | Mjelde |
| 2014/0167821 A1 | 6/2014 | Yang et al. |
| 2014/0180567 A1 | 6/2014 | Fetsch |
| 2014/0183376 A1 | 7/2014 | Perkins |
| 2014/0195261 A1 | 7/2014 | Rasquinha et al. |
| 2014/0201064 A1 | 7/2014 | Jackson et al. |
| 2014/0210503 A1 | 7/2014 | Tam |
| 2014/0215190 A1 | 7/2014 | Mylius et al. |
| 2014/0220966 A1 | 8/2014 | Muetzel et al. |
| 2014/0267688 A1 | 9/2014 | Aich et al. |
| 2014/0372498 A1* | 12/2014 | Mian ............... H04L 67/12 709/201 |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0168173 A1 | 6/2015 | Lewis-Evans et al. |
| 2015/0260529 A1 | 9/2015 | Petersen |
| 2015/0332525 A1 | 11/2015 | Harris et al. |

FOREIGN PATENT DOCUMENTS

| | | |
|---|---|---|
| CA | 2709740 A1 | 7/2009 |
| CA | 2712576 A1 | 2/2011 |
| CA | 2828835 A1 | 4/2014 |
| CA | 2832185 A1 | 5/2014 |
| CN | 2921908 Y | 7/2007 |
| CN | 101192322 A | 6/2008 |
| CN | 101240734 A | 8/2008 |
| CN | 101734228 A | 6/2010 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A2 | 12/1983 |
| EP | 0393935 A2 | 10/1990 |
| EP | 0451482 A1 | 10/1991 |
| EP | 0519630 A2 | 12/1992 |
| EP | 0744727 A2 | 11/1996 |
| EP | 0581558 B1 | 4/1997 |
| EP | 0795760 A3 | 4/1999 |
| EP | 0806632 B1 | 4/1999 |
| EP | 0660083 B1 | 9/2000 |
| EP | 0795700 B1 | 11/2001 |
| EP | 1191500 A1 | 3/2002 |
| EP | 0767448 B1 | 12/2002 |
| EP | 0785132 B1 | 5/2003 |
| EP | 1324241 A1 | 7/2003 |
| EP | 1384635 A1 | 1/2004 |
| EP | 0763713 B1 | 5/2004 |
| EP | 1752949 A1 | 2/2007 |
| EP | 1777541 A1 | 4/2007 |
| EP | 1785744 A1 | 5/2007 |
| EP | 1791101 B1 | 2/2008 |
| EP | 1912191 A1 | 4/2008 |
| EP | 1944190 A1 | 7/2008 |
| EP | 1760655 A3 | 9/2008 |
| EP | 2000889 A2 | 12/2008 |
| EP | 1870788 B1 | 10/2009 |
| EP | 1894779 B1 | 11/2009 |
| EP | 1975563 A3 | 11/2009 |
| EP | 1975565 A3 | 11/2009 |
| EP | 1804223 B1 | 12/2009 |
| EP | 1927961 B1 | 1/2010 |
| EP | 2154026 A1 | 2/2010 |
| EP | 2339562 A1 | 6/2011 |
| EP | 2418461 A1 | 2/2012 |
| EP | 2528043 A1 | 11/2012 |
| EP | 1975566 A3 | 12/2012 |
| EP | 1742083 B1 | 1/2013 |
| EP | 1895273 A3 | 1/2013 |
| EP | 2747004 A1 | 6/2014 |
| JP | 2006123891 A | 5/2006 |
| JP | 2014170000 A | 9/2014 |
| WO | 8401823 A1 | 5/1984 |
| WO | 9834314 A1 | 8/1998 |
| WO | 9963357 A1 | 12/1999 |
| WO | 0070530 A1 | 11/2000 |
| WO | 0124393 A1 | 4/2001 |
| WO | 0159601 A1 | 8/2001 |
| WO | 0175472 A2 | 10/2001 |
| WO | 0219683 A1 | 3/2002 |
| WO | 02089077 A1 | 11/2002 |
| WO | 03012473 A1 | 2/2003 |
| WO | 03034089 A2 | 4/2003 |
| WO | 03036462 A1 | 5/2003 |
| WO | 03079717 A2 | 9/2003 |
| WO | 2004009473 A1 | 1/2004 |
| WO | 2004051594 A2 | 6/2004 |
| WO | 2004075090 A1 | 9/2004 |
| WO | 2004086076 A2 | 10/2004 |
| WO | 2004102536 A2 | 11/2004 |
| WO | 2005008603 A1 | 1/2005 |
| WO | 2006053566 A1 | 5/2006 |
| WO | 2008034097 A2 | 3/2008 |
| WO | 2008118578 A2 | 10/2008 |
| WO | 2008141456 A1 | 11/2008 |
| WO | 2009058972 A2 | 5/2009 |
| WO | 2009080070 A1 | 7/2009 |
| WO | 2009097595 A1 | 8/2009 |
| WO | 2009112305 A1 | 9/2009 |
| WO | 2009158469 A1 | 12/2009 |
| WO | 2011011544 A1 | 1/2011 |
| WO | 2011037766 A2 | 3/2011 |
| WO | 2011037800 A2 | 3/2011 |
| WO | 2011070534 A2 | 6/2011 |
| WO | 2013016581 A1 | 1/2013 |
| WO | 2014008752 A1 | 1/2014 |
| WO | 2014062668 A1 | 4/2014 |

OTHER PUBLICATIONS

"Save Money On Fleet Fueling Purchases", Sokolis Group Fuel Managment, Jan. 26, 2011 by Sokolis (p. 1) http://www.sokolisgroup.com/blog/save-money-on-fleet-fueling-purchases/.
"Sensor-based Logistics: Monitoring Shipment Vital Signs in Real Time", Inbound Logistics, Jun. 2013 by Chris Swearingen (pp. 2)

(56) References Cited

OTHER PUBLICATIONS http://www.inboundlogistics.com/cms/article/sensor-based-logistics-monitoring-shipment-vital-signs-in-real-time/.
"Electronic Cargo Tracking System and Solution, Intermodal Real-time Container Tracking and Rail Car Transport Security Tracking System for End-to-End Supply Chain Security System and Tracking Solution", Cargo Tracking Solution & intermodal Transport Monitoring, Avante International Technology, Inc. in 2001-2015 (pp. 11) http://www.avantetech.com/products/shipping/.
"Sea Container Tracking Methods", Moving-Australia, 2012 (pp. 3) http://www.moving-australia.co.uk/container/tracking-methods.php.
"GlobalTag For Global Visibility and Tracking", Global Tracking Technology, in 2015 (pp. 5) http://globaltrackingtechnology.com/globaltag-for-global-visibility.html.
"The Course of the 'Connected' Car", It Is Innovation, Emphasis on safety, Jan. 6, 2013 by Murray Slovick (pp. 4) http://www.ce.org/i3/Features/2013/January-February/The-Course-of-the-Connected-car.aspx.
"Cooperating Embedded Systems and Wireless Sensor Networks", John Wiley & Sons, Inc., ISBN: 978-1-84821-000-4, Mar. 10, 2008 by Michel Banatre et al. (pp. 2) http://as.wiley.com/WileyCDA/WileyTitle/productCd-1848210000.html.
"Mitsubishi Motors Develops New Driver Support System", Mitsubishi Motors, Dec. 15, 1998 (pp. 5) http://www.mitsubishi-motors.com/en/corporate/pressrelease/corporate/detail429.html.
"Vehicle Tracking for an Evasive Manoeuvres Assistant Using Low-Cost Ultrasonic Sensors", EBSCO Host Connections, 2014, vol. 14 Issue 12, p. 22689, Dec. 2014 by Jiménez, Felipe et al. (p. 1) http://connection.ebscohost.com/c/articles/100145890/vehicle-tracking-evasive-manoeuvres-assistant-using-low-cost-ultrasonic-sensors.
"The End of Demographics: How Marketers Are Going Deeper With Personal Data", Mashable Journal, in Jul. 1, 2011 by Jamie Beckland (pp. 7) http://mashable.com/2011/06/30/psychographics-marketing/.
"Power cycling 101: Optimizing energy use in advanced sensor products", Analog Dialogue, vol. 44, Aug. 2010 by Mark Looney (pp. 7) http://www.analog.com/library/analogdialogue/archives/44-08/power_cycling.html.
"Dynamic Vehicle Detection Via The Use Of Magnetic Field Sensors", MDPI, Jan. 19, 2016 by Vytautas Markevicius et al. (pp. 9) http://www.mdpi.com/1424-8220/16/1/78/pdf.
"Accuracy And Resource Consumption In Tracking And Location Prediction", 8th International Symposium, Jul. 2003 by Ouri Wolfson et al. (pp. 4) http://link.springer.com/chapter/10.1007/978-3-540-45072-6_19.
"A Heuristic Moving Vehicle Location Prediction Technique Via Optimal Paths Selection With Aid Of Genetic Algorithm And Feed Forward Back Propagation Neural Network", Journal of Computer Science, Dec. 12, 2012 by Baby Anitha, E. et al. (pp. 9) http://citeseerx.ist.psu.edu/viewdoc/download?doi=10.1.1.687.3596&rep=rep1&type=pdf.
"Location Estimation And Trajectory Prediction Of Moving Lateral Vehicle Using Two Wheel Shapes Information In 2-D Lateral Vehicle Images By 3-D Computer Vision Techniques", IEEE Xplore, Sep. 14-19, 2003 by Chih-Chiun Lai et al. (p. 1) http://ieeexolore.ieee.org/xpl/articleDetails.jsp?arnumber=1241704.
"Adaptive Location Prediction Strategies Based On A Hierarchical Network Model In A Cellular Mobile Environment", The Computer Journal, May 1999 by Sajal K. Das et al. (p. 1) https://goo.gl/C27yaT.
"Automatic Transit Tracking, Mapping, And Arrival Time Prediction Using Smartphones", ACM Digital Library, Nov. 1-4, 2011 by James Biagioni et al. (pp. 14) https://www.cs.uic.edu/~jakob/papers/easytracker-sensys11.pdf.
"Location Prediction And Queries For Tracking Moving Objects", IEEE Xplore, 2000 by O. Wolfson et al. (p. 1) http://ieeexplore.ieee.org/xpl/articleDetails.jsp?arnumber=839495.
"A Novel Vehicular Location Prediction Based On Mobility Patterns for Routing In Urban VANET", EURASIP Journal on Wireless Communications and Networking, Dec. 2012 by Guangtao Xue et al. (pp. 28) http://link.springer.com/article/10.1186/1687-1499-2012-222.
"Vision-Based Vehicle Detection System With Consideration Of The Detecting Location", IEEE Xplore, Apr. 3, 2012 by Minkyu Cheon et al. (p. 1) http://ieeexplore.ieee.org/xpl/articleDetails.jsp?arnumber=6175131.
"A Vehicle Detection Approach Based On Multi-Features Fusion In The Fisheye Images", IEEE Xplore, Mar. 11-13, 2011 by Guangtao Cheng et al. (p. 1) http://ieeexplore.ieee.org/xpl/articleDetails.jsp?arnumber=5763840.

\* cited by examiner

| SERVICE PROVIDER 138 | TRAILER 102 | STORAGE STATE AT DEPARTURE TIME 402 | DISTANCE (MILES) DURATION 404 | CURRENT LOCATION 406 | CURRENT STORAGE STATE 408 | STORAGE SPACE AVAILABLE 410 | LOADING? 412 | DESTINATION LOCATION 414 |
|---|---|---|---|---|---|---|---|---|
| 02/25/2014 | | 02/25/2014 | STARTING FROM 1702 LENOX ROAD, SCHENECTADY, NY 12308, USA | | | | | |
| | | 7:37 AM | BEGINNING OF DAY: START OF FIRST JOURNEY | | | | | |
| FLEET 1 | TRAILER 1 | Loaded | 18:35 1249 miles | Willoughby Hills, OH 44094 | Partially Loaded | Partially Available | YES | Kansas City, MO USA |
| | TRAILER 2 | Loaded | 15:12 1022 miles | Willoughby Hills, OH 44094 | Loaded | None | No | Kansas City, MO USA |
| | TRAILER 3 | Loaded | 18:51 1227 miles | Willoughby Hills, OH 44094 | Empty | Available | YES | Kansas City, MO USA |
| FLEET 2 | TRAILER 1 | Loaded | 18:35 1249 miles | Harrisonburg, VA USA | Empty | Available | YES | Capitol View Manor, Atlanta, GA, USA |
| | TRAILER 2 | Loaded | 15:12 1022 miles | Harrisonburg, VA USA | Loaded | None | No | Capitol View Manor, Atlanta, GA, USA |
| | TRAILER 3 | Loaded | 18:51 1227 miles | Harrisonburg, VA USA | Empty | Available | YES | Capitol View Manor, Atlanta, GA, USA |
| ... | ... | ... | ... | ... | ... | ... | ... | ... |

TABLE VIEW 450

FIGURE 4

FLEET PAN TO PROVIDE MEASUREMENT AND LOCATION OF A STORED TRANSPORT ITEM WHILE MAXIMIZING SPACE IN AN INTERIOR CAVITY OF A TRAILER

FIELD OF TECHNOLOGY

This disclosure relates generally to automotive technology and, more particularly, to a method, a device and/or a system of an enclosure in a form of a fleet pan to provide measurement and location of a stored transport item while maximizing space in an interior cavity of a trailer.

BACKGROUND

A transportation services provider (e.g., a logistics provider) may be compensated based on available room inside of a cargo area of a trailer of a transportation vehicle (e.g., a semi-trailer truck). For this reason, the transportation service provider may determine a maximum volume the cargo area can hold based on available room inside the trailer. This information may be used to determine whether the transportation services provider can adequately service a particular customer request. When available space inside of the cargo area is short, the transportation services provider may need to turn down work.

Furthermore, a transportation services provider may be compensated based, at least in part, on how much time is needed to load and/or unload a trailer of a transportation vehicle. For this reason, the transportation service provider may determine when the storage state of a trailer changes.

Therefore, a focal point used in optimizing trailer utilization may be whether, when, where and to which extent the trailer is loaded. Sensors (e.g. weight sensors, wave sensors) employed in an interior space of the cargo area may not accurately measure an inventory level. Further, these sensors occupying the interior space of the cargo area may reduce available space for the transportation of goods. For example, 450 sq. ft. of space may no longer be available for the transportation of goods when sensors are placed in the interior space of the cargo area of the trailer. The problem is further compounded because modern trailers (e.g., Dura-Plate™ composite panel based trailers) may not have a liner gap inside the walls of the trailers in which to place electronics. Because of this, valuable space inside the cargo area of the trailer may be wasted. To save space, the transportation services provider may elect to not install sensors. However, new problems may arise such as drivers may embark on long journeys, when, in fact, their cargo area is not used to its full capacity (e.g., may even be empty). This may lead to wasted time, fuel, efficiency, customer dissatisfaction, and/or ultimately, loss of revenue for the transportation services provider.

SUMMARY

Disclosed are a method, a device and/or a system of a fleet pan to provide measurement and location of a stored transport item while maximizing space in an interior cavity of a trailer.

In one aspect, a trailer of a semi-trailer truck includes a cargo container having affixed at a height of approximately forty-six inches from a base of the cargo container a hole that is approximately two and one half inches in diameter. The trailer includes a fleet pan enclosure in a form of a housing encompassing a communications circuitry, a global positioning device, and an ultrasound sensor to project into an interior cavity of the cargo container through the hole. The global positioning device provides an accurate reporting of a location of the semi-trailer truck to a central server. An antenna of the communications circuitry is fully encompassed within the housing. The location at which the housing is affixed provides for an effective measuring and/or reliable locating of a stored transport item inside the interior cavity of the cargo container through the hole.

An emitting face of the ultrasound sensor may be tight-sealed to prevent moisture from entering an ultrasound sensor housing with a hydrophobic material. A risk of water damage to the ultrasound sensor may be minimized through a tight-sealing of the emitting face of the ultrasound sensor. A low-ultrasound-attenuation material may be utilized to produce a tight seal of an ultrasound sensor emitting face. An ultrasound wave emanating from the ultrasound sensor emitting face may be permitted maximal penetration of such that the ultrasound wave is focusable in a manner that the ultrasound wave accurately measures a height of the stored transport item in a storage location of the interior cavity of the trailer to optimize asset planning and/or managing of the stored transport item.

The low-ultrasound-attenuation material may be shaped to produce a cast acoustic emitting face with a curvature such that a shape of a wave-front of the ultrasound wave produced by the ultrasound sensor is focused on a desired point. An accuracy of the measurement of the height of the stored transport item may be maximized in the storage location of the interior cavity of the trailer to optimize asset planning and/or managing of the stored transport item. A current state of a transport item may be determined to be a loaded state, a partially loaded state, and/or an empty state based on a reading of an ultrasonic sensor. A compliance of a driver of a motorized cabin may be audited based on a communication between the central server and the communication circuitry within the fleet pan enclosure.

The fleet pan enclosure may be created from a LEXAN polycarbonate offering impact resistance, dimensional stability and/or signal clarity such that the antenna of the communication circuitry may communicate externally with the central server while still being fully encompassed within the housing.

In another aspect, an apparatus includes a housing encompassing a communication circuitry, a global positioning device and an ultrasound sensor affixed on a vertical face of an exterior front surface of a trailer toward a driver cabin of a semi-trailer truck. The global positioning device provides an accurate reporting of a location of the semi-trailer truck to a central server. An antenna of the communications circuitry is fully encompassed within the housing. The ultrasound sensor peers inside an interior cavity of the trailer through a hole formed on the vertical face between the housing and the interior cavity. The location at which the housing is affixed provides for an effective measuring and/or reliable locating of a stored transport item through the hole.

In yet another aspect, a cargo container includes a fleet pan enclosure in a form of a housing encompassing a communications circuitry, a global positioning device, and an ultrasound sensor to project into an interior cavity of the cargo container through a hole. The cargo container having affixed at a height of approximately forty-six inches from a base of the cargo container, the hole that is approximately two and one half inches in diameter. The global positioning device provides an accurate reporting of a location of a semi-trailer truck to a central server. An antenna of the communications circuitry is fully encompassed within the housing. The location at which the housing is affixed provides for an effective measuring and/or reliable locating of a stored transport item inside the interior cavity of the cargo container through the hole.

The method, apparatus, and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the Figures of the accompanying drawings, in which like references indicate similar elements and in which:

FIG. 4 is a table view of the fleet pan enclosure of FIG. 1, according to one embodiment.

Figure 1:
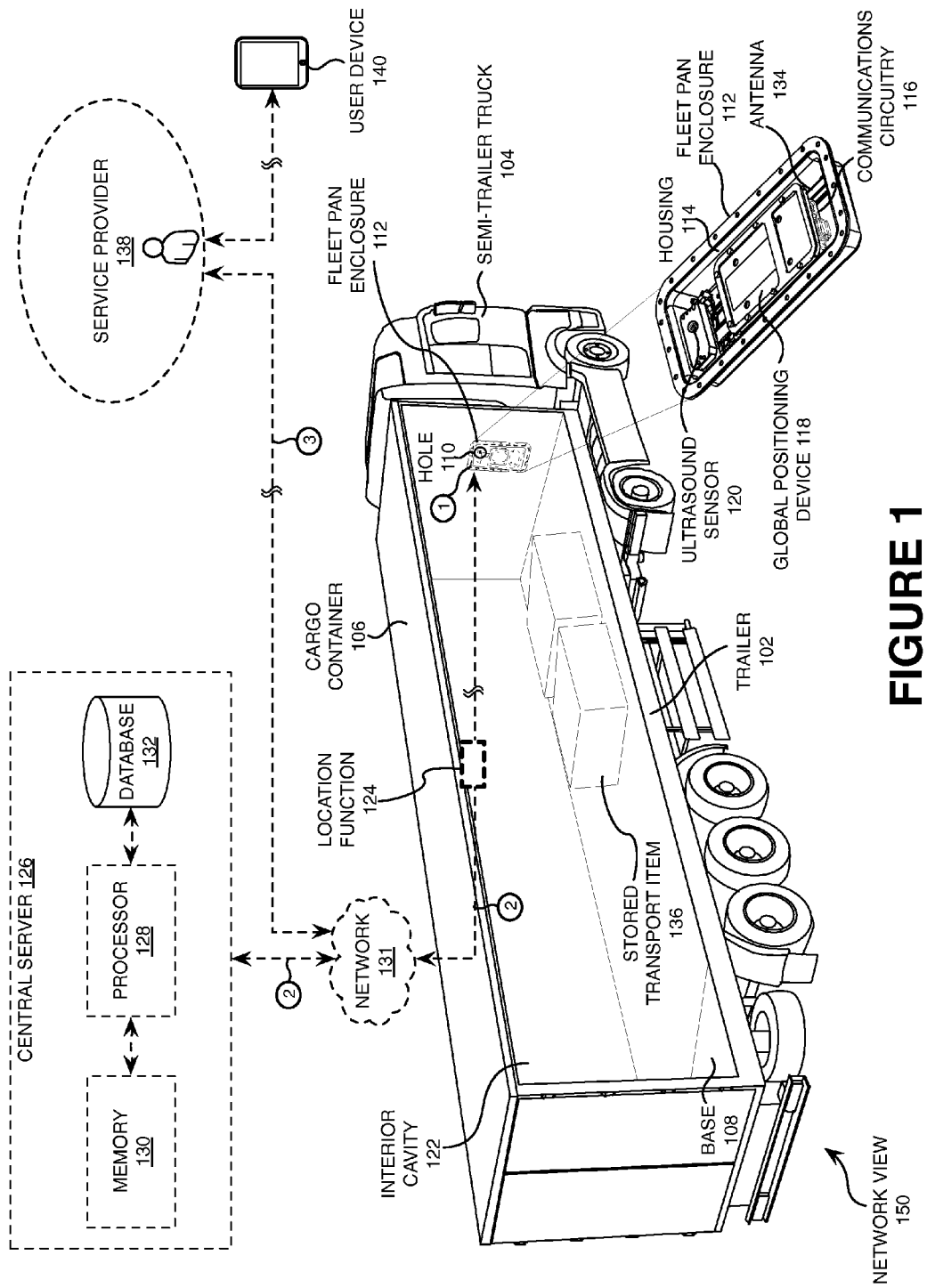
FIG. 1 is a network view illustrating a fleet pan enclosure affixed in a cargo container providing an accurate reporting of a location of a semi-trailer truck to a central server, according to one embodiment.

Other features of the present embodiments will be apparent from the accompanying drawings and from the detailed description that follows.

DETAILED DESCRIPTION

Example embodiments, as described below, may be used to provide a method, a device and/or a system of a fleet pan to provide measurement and location of a stored transport item while maximizing space in an interior cavity of a trailer.

In one embodiment, a trailer 102 of a semi-trailer truck 104 includes a cargo container 106 having affixed at a height 306 of approximately forty-six inches from a base 108 of the cargo container 106 a hole 110 that is approximately two and one half inches in diameter. The trailer 102 includes a fleet pan enclosure 112 in a form of a housing 114 encompassing a communications circuitry 116, a global positioning device 118, and an ultrasound sensor 120 to project into an interior cavity 122 of the cargo container 106 through the hole 110. The global positioning device 118 provides an accurate reporting of a location (e.g., using location function 124 of the central server 126) of the semi-trailer truck 104 to a central server 126. An antenna 134 of a communications circuitry 116 is fully encompassed within the housing 114. The location (e.g., using location function 124 of the central server 126) at which the housing 114 is affixed provides for an effective measuring and/or reliable locating (e.g., using current state function 310 of the central server 126) of a stored transport item 136 inside the interior cavity 122 of the cargo container 106 through the hole 110.

An emitting face 202 of the ultrasound sensor 120 may be tight-sealed to prevent moisture from entering an ultrasound sensor housing 204 with a hydrophobic material. A risk of water damage to the ultrasound sensor 120 may be minimized through a tight-sealing 208 of the emitting face 202 of the ultrasound sensor 120. A low-ultrasound-attenuation material may be utilized to produce a tight seal of an ultrasound sensor emitting face 206. An ultrasound wave 302 emanating from the ultrasound sensor emitting face 206 may be permitted maximal penetration of such that the ultrasound wave 302 is focusable in a manner that the ultrasound wave 302 accurately measures a height 306 of the stored transport item 136 in a storage location 304 (e.g., using current state function 310 of the central server 126) of the interior cavity 122 of the trailer 102 to optimize asset planning and/or managing of the stored transport item 136.

The low-ultrasound-attenuation material may be shaped to produce a cast acoustic emitting face 202 with a curvature such that a shape of a wave-front of the ultrasound wave 302 produced by the ultrasound sensor 120 is focused on a desired point 308. An accuracy of the measurement of the height 306 of the stored transport item 136 may be maximized in the storage location 304 of the interior cavity 122 of the trailer 102 to optimize asset planning and/or managing of the stored transport item 136. A current state (e.g., using the current state function 310 of the central server 126) of a transport item may be determined to be a loaded state (e.g., using the loaded state algorithm 312 of the central server 126), a partially loaded state (e.g., using the partially loaded state algorithm 314 of the central server 126), and/or an empty state (e.g., using the empty state algorithm 316 of the central server 126) based on a reading of an ultrasonic sensor. A compliance (e.g., using the compliance function 318 of the central server 126) of a driver 320 of a motorized cabin 322 may be audited based on a communication (e.g., using communication function 324 of the central server 126) between the central server 126 and the communications circuitry 116 within the fleet pan enclosure 112.

The fleet pan enclosure 112 may be created from a LEXAN polycarbonate offering impact resistance, dimensional stability and/or signal clarity such that the antenna 134 of the communications circuitry 116 may communicate (e.g., using communication function 324 of the central server 126) externally with the central server 126 while still being fully encompassed within the housing 114.

In another embodiment, an apparatus includes a housing 114 encompassing a communications circuitry 116, a global positioning device 118 and an ultrasound sensor 120 affixed on a vertical face of an exterior front surface of a trailer 102 toward a driver cabin of a semi-trailer truck 104. The global positioning device 118 provides an accurate reporting of a location (e.g., using location function 124 of the central server 126) of the semi-trailer truck 104 to a central server 126. An antenna 134 of the communications circuitry 116 is fully encompassed within the housing 114. The ultrasound sensor 120 peers inside an interior cavity 122 of the trailer 102 through a hole 110 formed on the vertical face between the housing 114 and the interior cavity 122. The location (e.g., using the location function 124 of the central server 126) at which the housing 114 is affixed provides for an effective measuring and/or reliable locating (e.g., using current state function 310 of the central server 126) of a stored transport item 136 through the hole 110.

In yet another embodiment, a cargo container 106 includes a fleet pan enclosure 112 in a form of a housing 114 encompassing a communications circuitry 116, a global positioning device 118, and an ultrasound sensor 120 to project into an interior cavity 122 of the cargo container 106 through a hole 110. The cargo container 106 having affixed at a height 306 of approximately forty-six inches from a base 108 of the cargo container 106 the hole 110 that is approximately two and one half inches in diameter. The global positioning device 118 provides an accurate reporting of a location (e.g., using location function 124 of the central server 126) of a semi-trailer truck 104 to a central server 126. An antenna 134 of a communications circuitry 116 is fully encompassed within the housing 114. The location at which the housing 114 is affixed provides for an effective measuring and/or reliable locating (e.g., using current state function 310 of the central server 126) of a stored transport item 136 inside the interior cavity 122 of the cargo container 106 through the hole 110.

FIG. 1 is a network view 150 illustrating a fleet pan enclosure 112 affixed in a cargo container 106 providing an accurate reporting of a location of a semi-trailer truck 104 to a central server 126, according to one embodiment. Particularly, FIG. 1 illustrates a trailer 102, a semi-trailer truck 104, a cargo container 106, a base 108, a hole 110, a fleet pan enclosure 112, a housing 114, a communications circuitry 116, a global positioning device 118, an ultrasound sensor 120, an interior cavity 122, a location function 124, a central server 126, a processor 128, a memory 130, a network 131, a database 132, an antenna 134, a stored transport item 136, a service provider 138, and a user device 140, according to one embodiment.

The trailer 102 may be a nonmotorized vehicle designed to be hauled by a motor vehicle (e.g., a truck, utility vehicles, and/or a tractor). The semi-trailer truck 104 may be a large vehicle that consists of a towing engine, known as a tractor and/or a truck, attached to one or more semi-trailers to carry freight. The cargo container 106 may be a large vessel of standardized dimensions that may be loaded with cargo. In some embodiments, the cargo container may be loaded from one form of transport to another for freight. In other embodiments, the cargo container 106 may be a permanent part of the trailer 102. In some embodiments, the cargo container 106 may include a liner. The base 108 may be the lowest part of the cargo container 106 on which goods are kept for freighting. The hole 110 may be a hollow place in the solid body of cargo container 106 that may be used for affixing the fleet pan enclosure 112. The fleet pan enclosure 112 may be a system and/or a device used for remotely monitoring a number of semi-trailer truck(s) 104 engaged in freighting under the same ownership, according to one embodiment.

The housing 114 may be a rigid casing that encloses and protects the various components of the fleet pan enclosure 112. The communications circuitry 116 may be a system of circuits performing an exchange of information to follow the movement of semi-trailer truck 104 affixed with the fleet pan enclosure 112. The global positioning device 118 may be a space-based satellite navigation system that provides location and time information of the semi-trailer truck 104 affixed with the fleet pan enclosure 112 to the service provider 138 in all weather conditions, anywhere, where there is an unobstructed line of sight to four or more GPS satellites. The ultrasound sensor 120 may be a system and/or a device to both send and receive the sound wave to evaluate the attributes (e.g., to accurately detect objects and measure distances) of a target (e.g., stored transport item 136), according to one embodiment.

The interior cavity 122 may be the empty space in the inner part of the cargo container 106 to which the fleet pan enclosure 112 is affixed. The location function 124 may be a named section of a program that performs a specific task of tracking down the geographical place of the cargo container 106 to which the fleet pan enclosure 112 is affixed. The central server 126 may be a computer system that provides local area networking services to multiple users (e.g., service provider 138) by managing resources and services of the network 131, while handling requests by the service provider 138 from different computers to access the said resources. The processor 128 may be a logic circuitry that responds to and processes the basic instructions that drives the central server 126 for monitoring the semi-trailer truck 104. The memory 130 may be an electronic holding place for instructions and data that the processor 128 of the central server 126 can reach quickly. The network 131 may be a group of computing devices (e.g., hardware and software) that are linked together through communication channels to facilitate communication and resource-sharing among a wide range of entities (e.g., service provider 138). The database 132 may be a collection of information that is organized to be easily accessed, managed, and/or updated by the service provider 138, according to one embodiment.

The antenna 134 may be a conductor that can transmit, send and receive signals (e.g., microwave, radio or satellite signals) from the fleet pan enclosure 112 affixed in the semi-trailer truck 104. The stored transport item 136 may be the goods that need to be shifted by means of semi-trailer truck 104. The service provider 138 may be a company (e.g., a logistics provider) that provides its freighting and/or transportation services using the semi-trailer truck 104 to its customers. The user device 140 may be a computing device (e.g., mobile device, tablet, desktop computer and/or tablet) that is made for portability for data storage, processing, and/or display technologies and run various types of application software that enables the service provider 138 to access the central server 126, according to one embodiment.

The current location of semi-trailer truck 104 may be established by the fleet pan enclosure 112 affixed in the hole 110 of the cargo container 106. In circle '1', the fleet pan enclosure 112 may project into the interior cavity 122 of the cargo container 106 through the hole 110. In circle '2', the fleet pan enclosure 112 may be communicatively coupled to the central server 126 through the network 131. In circle '3', the service provider 138 may be communicatively coupled to the central server 126 through the network 131, according to one embodiment.

Figure 2A:
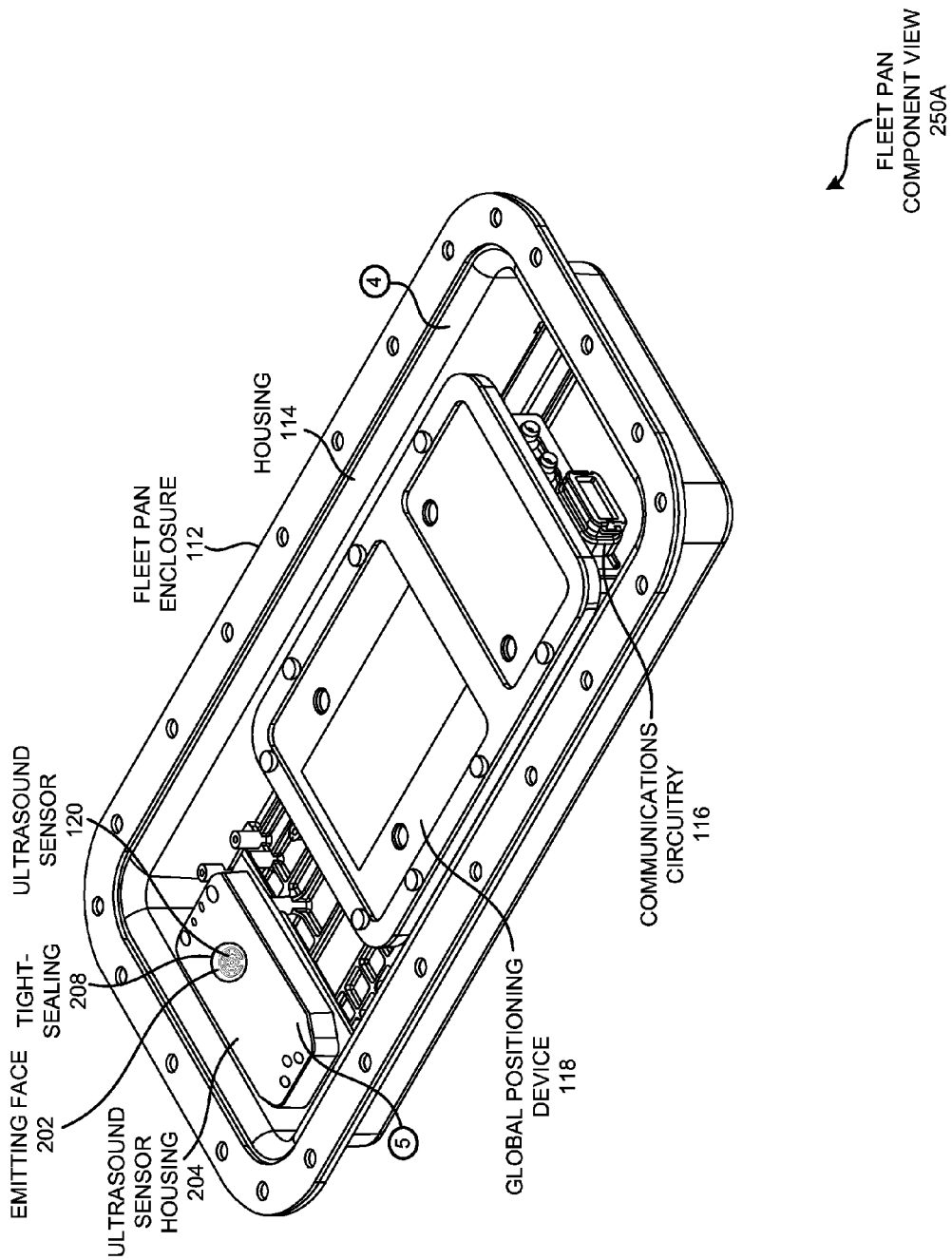
FIG. 2A is a fleet pan component view of the fleet pan enclosure of FIG. 1, according to one embodiment.

FIG. 2A is a fleet pan component view 250A of the fleet pan enclosure 112 of FIG. 1, according to one embodiment. Particularly, FIG. 2A builds on FIG. 1 and further adds an emitting face 202, an ultrasound sensor housing 204, and a tight-sealing 208, according to one embodiment.

The emitting face 202 may be the uppermost layer of the ultrasound sensor 120 releasing the sound waves to evaluate the attributes (e.g., to accurately detect objects and measure distances) of a target (e.g., stored transport item 136). The ultrasound sensor housing 204 may be a rigid casing that encloses and protects the various components of the ultrasound sensor 120. The tight-sealing 208 may be a nonporous impervious material coating that is used to close off or fasten to prevent moisture to enter the ultrasound sensor housing 204, according to one embodiment.

In circle '4', the fleet pan enclosure 112 may be in a form of a housing 114. The housing 114 may enclose the communications circuitry 116, the global positioning device 118 and the ultrasound sensor 120 within its casing. In circle '5', the ultrasound sensor housing 204 may cover the ultrasound sensor 120. The emitting face 202 of the ultrasound sensor 120 may have a tight-sealing 208, according to one embodiment.

In some embodiments, the fleet pan enclosure 112 may comprise the ultrasound sensor 120, to evaluate the attributes of a target (e.g. stored transport item 136, etc.). In other embodiments, other types of sensors may be used to evaluate such attributes, including, but not limited to, optical sensors, cameras, laser rangefinders, and/or other distance measuring technology. As an option, optical sensors or cameras may be used in conjunction with machine vision software and/or hardware. Furthermore, a camera may be used to provide an image to at least one of a driver, a client, a dispatcher, an inspector, and/or a third party.

Figure 2B:
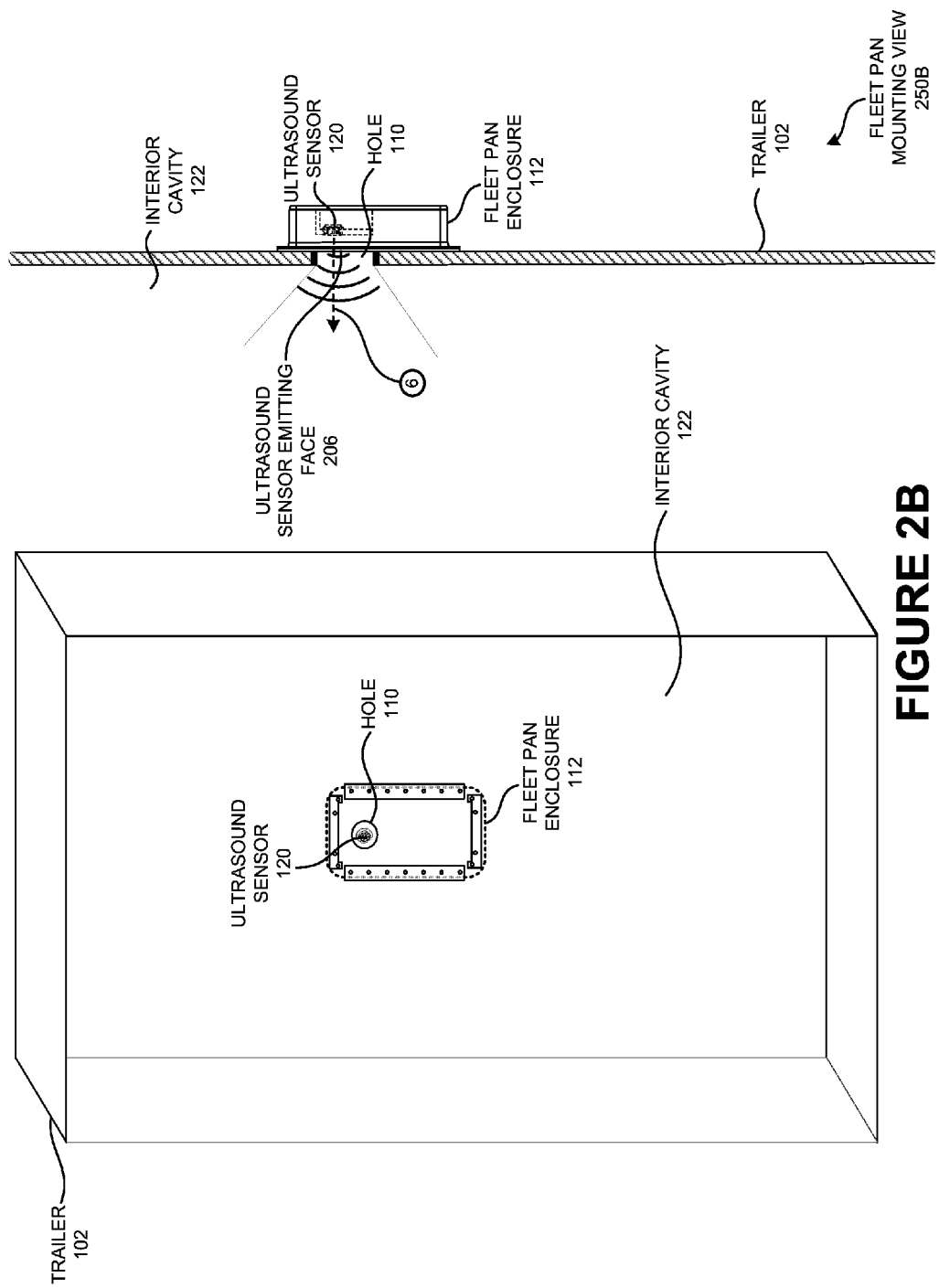
FIG. 2B is a fleet pan mounting view of the fleet pan enclosure of FIG. 1, according to one embodiment.

FIG. 2B is a fleet pan mounting view 250B of the fleet pan enclosure 112 of FIG. 1, according to one embodiment. Particularly, FIG. 2B builds on FIG. 1 and FIG. 2A and further adds an ultrasound sensor emitting face 206, according to one embodiment.

The ultrasound sensor emitting face 206 may be the uppermost layer of the ultrasound sensor 120 releasing the sound waves to evaluate the attributes (e.g., to accurately detect objects and measure distances) of a target (e.g., stored transport item 136), according to one embodiment.

In circle '6', the fleet pan enclosure 112 may be mounted on the outside of the trailer 102 through the hole 110, according to one embodiment. In one embodiment, the fleet pan enclosure 112 may be mounted such that the hole 110 is approximately forty-six inches from the base of the cargo container. In other embodiments, the hole 110 may be located between thirty and forty-eight inches from the base of the cargo container.

In various embodiments, the fleet pan enclosure 112 may be mounted on a trailer 102 which is loaded with cargo, without requiring the unloading of the cargo. As a specific example, a drilling template may be positioned such that the cargo sensor hole 110 is within 40 to 46 inches from the interior base of the cargo container, and secured to the trailer nose with screws. Using the template, mounting holes and the cargo sensor hole 110 may be drilled into the outside of the trailer. In the scenario where the trailer has an interior liner, a hole may be cut into the outside of the trailer which may receive, at least in part, the fleet pan enclosure, such that the ultrasound sensor emitting face, or its equivalent, may sit flush with liner. Furthermore, a cargo sensor hole may be cut into any liner which may be inside the trailer. The fleet pan enclosure may then be mounted on the outside of the trailer. The use of a vacuum system in conjunction with drills or other cutting equipment may reduce or prevent contamination of the interior of the loaded trailer and the cargo it holds.

Figure 3:
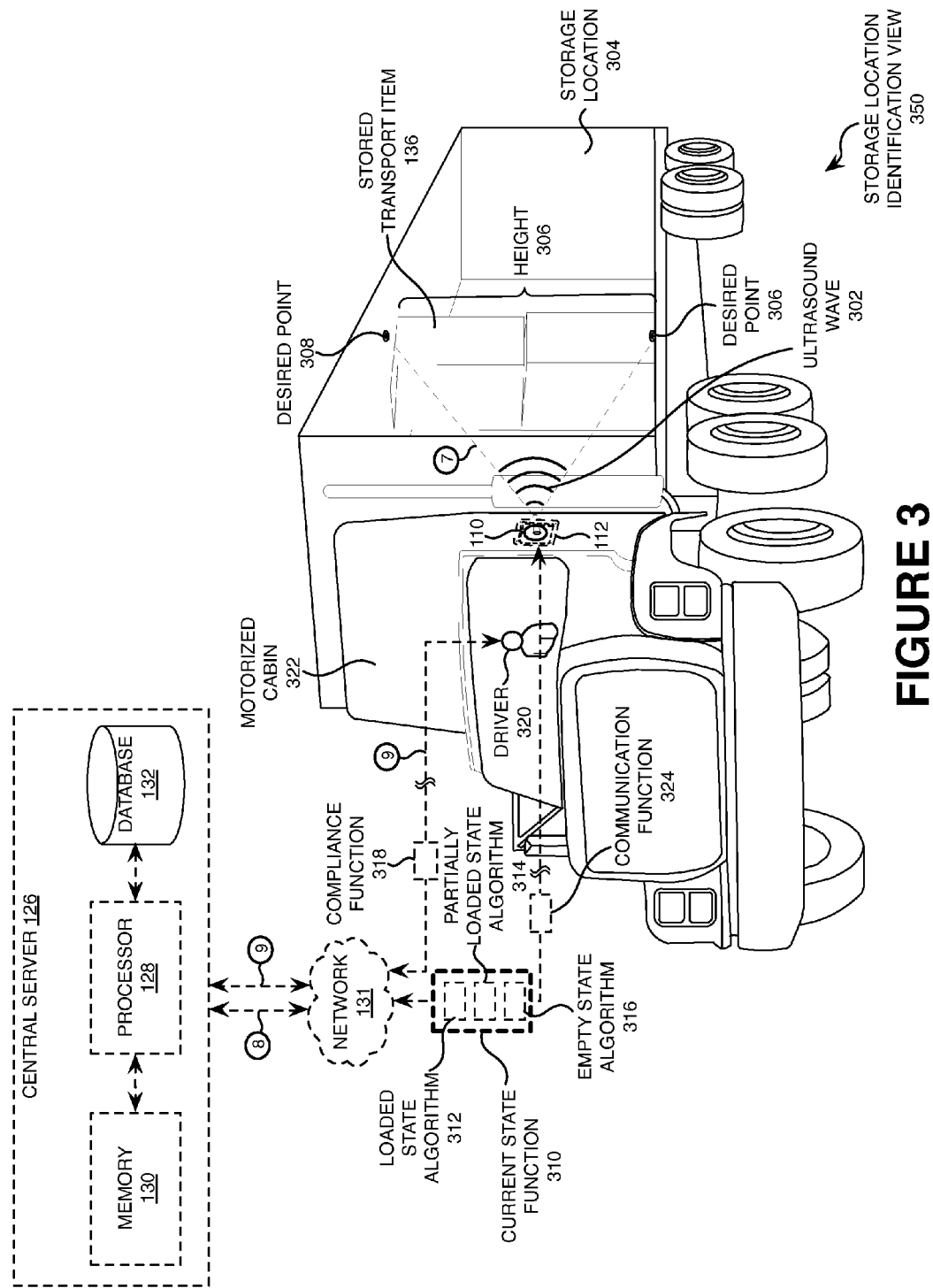
FIG. 3 is a storage location identification view of the semi-trailer truck of FIG. 1, according to one embodiment.

FIG. 3 is a storage location identification view 350 of the semi-trailer truck 104 of FIG. 1, according to one embodiment. Particularly, FIG. 3 builds on FIG. 1, FIG. 2A and FIG. 2B and further adds an ultrasound wave 302, a storage location 304, a height 306, a desired point 308, a current state function 310, a loaded state algorithm 312, a partially loaded state algorithm 314, an empty state algorithm 316, a compliance function 318, a driver 320, a motorized cabin 322, and a communication function 324, according to one embodiment.

The ultrasound wave 302 may be the swaying motion of an oscillating sound pressure with a frequency greater than the upper limit of the human hearing range emitted by the ultrasound sensor 120 in order to evaluate the attributes (e.g., to accurately detect objects and measure distances) of a target (e.g., stored transport item 136). The storage location 304 may be a particular position or place for holding the goods in the interior cavity 122 of the cargo container 106. The height 306 may be the vertical measurement of the goods held in the interior cavity 122 from the base 108 of the cargo container 106 attributed using the ultrasound sensor 120. The desired point 308 may be the anticipated end to which the ultrasound wave 302 is focused by the ultrasound sensor 120 in order to measure the dimensions of the goods held in the interior cavity 122 of the cargo container 106, according to one embodiment.

The current state function 310 may be a named section of a program that performs a specific task of finding the present condition of availability of the area for holding the goods in the interior cavity 122 of the cargo container 106. The loaded state algorithm 312 may be a process or set of rules to be followed in calculations for finding if the interior cavity 122 of the cargo container 106 is filled to the capacity. The partially loaded state algorithm 314 may be a process or set of rules to be followed in calculations for finding if the interior cavity 122 of the cargo container 106 is filled to a limited extent of its capacity. The empty state algorithm 316 may be a process or set of rules to be followed in calculations for finding if the interior cavity 122 of the cargo container 106 is not filled to its full capacity, according to one embodiment.

The compliance function 318 may be a named section of a program that performs a specific task of directing the driver 320 of the semi-trailer truck 104 to act in accordance with the directive of the service provider 138. The driver 320 may be the person driving the semi-trailer truck 104. The motorized cabin 322 may be the private compartment for the driver 320 in the front portion of the semi-trailer truck 104. The communication function 324 may be a named section of a program that performs a specific task of exchanging the information regarding the tracking of semi-trailer truck 104 and its current state (e.g., using the current state function 310 of the central server 126) of availability of space in the interior cavity 122 of the cargo container 106, according to one embodiment.

In circle '7', the ultrasound sensor 120 may emanate the ultrasound wave 302 to enable maximum penetration at a desired point 308 to measure height 306 of the stored transport item 136. In various embodiments, the determination of the current storage state of the cargo container may be triggered by one or more events, including, but not limited to, a heartbeat message (e.g. a periodic signal, a response to an external signal, etc.), a vibration detected in deep sleep (e.g. activation of an accelerometer while in a power conservation state, etc.), the loading and/or unloading of the cargo container (e.g. sounds, vibrations, motions, and/or manual signals associated with the loading or unloading of the cargo container, etc.), the start and/or end of a trip (e.g. changes in GPS coordinates, vibrations, acceleration, sound, and/or manual signals associated with the start and/or end of a trip, etc.), and/or a predefined period of time after the end of a trip (e.g. 1 hour after arriving at GPS coordinates of intended destination and motion has stopped, etc.).

In circle '8', the current state of the availability of the area for holding the goods in the interior cavity 122 of the cargo container 106 may be communicated to the central server 126 through the network 131. In circle '9', the compliance may be communicated to the driver 320 through the network 131, according to one embodiment.

FIG. 4 is a table view of the fleet pan enclosure 112 of FIG. 1, according to at least one embodiment. Particularly, FIG. 4 is a table view 450 showing the fields associated with the service provider 138, trailer 102 and its corresponding storage state at departure time 402 field, distance with duration 404 field, current location 406 field, current storage state 408 field, storage space available 410 field, loading? 412 field, and a destination location 414 field, according to one embodiment.

Particularly, FIG. 4 illustrates an example of two records for a service provider 138 with two fleets of trailer having three trailers in each fleet. The service provider 138 may be sending two fleets of semi-trailer truck(s) 104 each having one trailer 102 from 1702 Lenox Road, Schenectady, N.Y. 12308, USA to Kansas City, Mo., USA as shown in the destination location 414 field. The service provider 138 may be able to monitor the storage state of 'trailer 1' as 'loaded' in the 'storage state at departure time 402' field. The service provider 138 may find the distance traveled by the semi-trailer truck 104 of 'trailer 1' and the time taken for travel in the 'distance (miles) duration 404' field. The service provider 138 may track the current position and the corresponding storage state of the semi-trailer truck 104 in the respective fields as shown in the 'current location 406' field and the 'current storage state 408' field. The availability of the storage space in the trailer may be shown in the 'storage space available 410' field. Depending upon the space available, the trailer may be loaded per the service provider's 138 instructions as shown in the 'loading? 412' field. The service provider 138 may monitor the destination location of the 'trailer 1' in the 'destination location 414' field, according to one embodiment.

Figure 5:
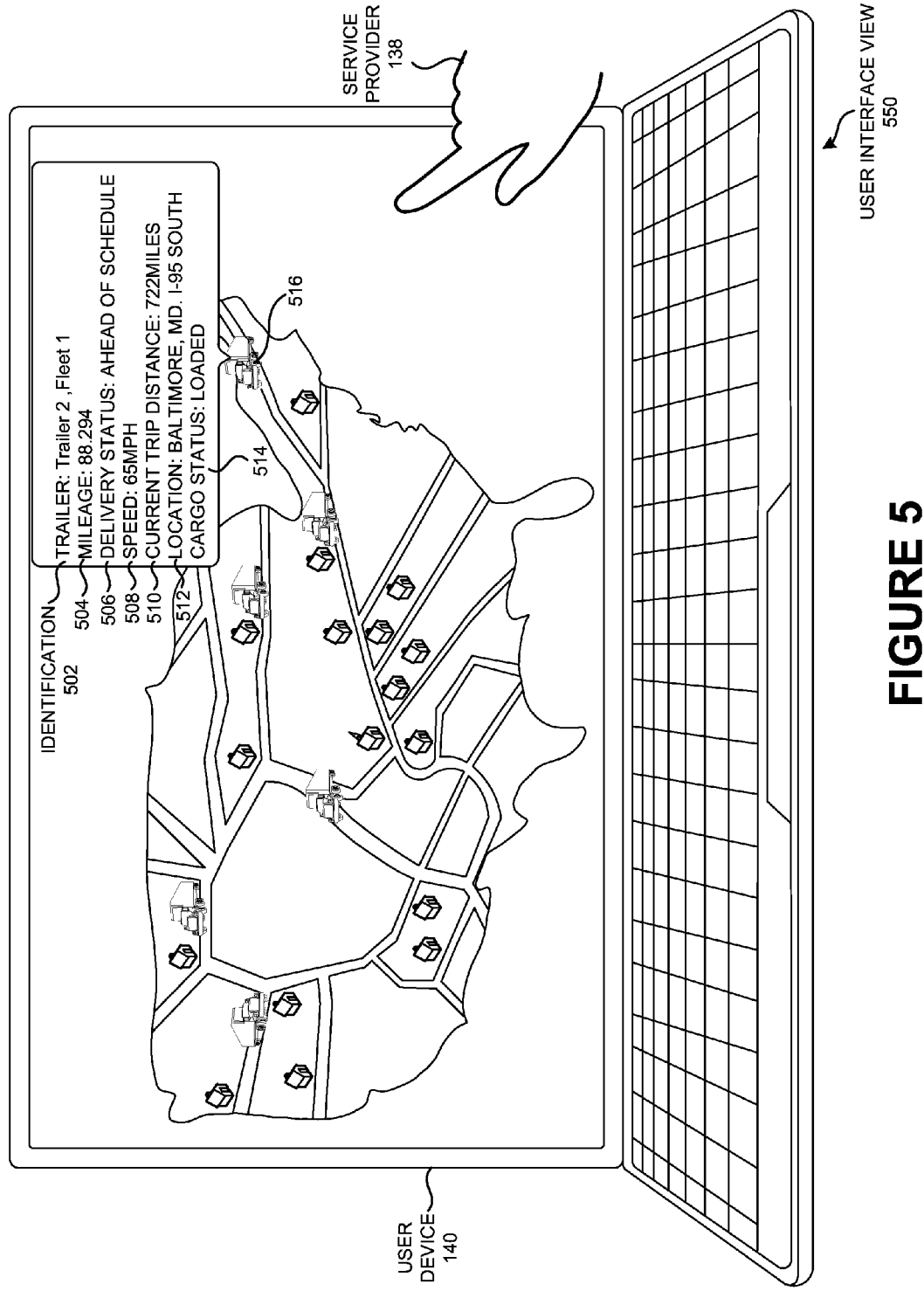
FIG. 5 is a user interface view illustrating the monitoring of the location of a semi-trailer truck affixed with fleet pan enclosure of FIG. 1, according to one embodiment.

FIG. 5 is a user interface view 550 illustrating the monitoring of the location of a semi-trailer truck 104 of FIG. 1, according to one embodiment. Particularly, FIG. 5 illustrates the current location 406 and current storage state 408 of the trailer 102 being monitored by the service provider 138. The service provider 138 may be able to establish the identification 502 of a particular semi-trailer truck 516 and the fleet that it belongs to as illustrated in the user interface. The service provider 138 may monitor the mileage 504 showing the distance traveled by the semi-trailer truck 516, the delivery status 506 of the semi-trailer truck 516, the speed 508 of the semi-trailer truck 104, the current trip distance 510 of the semi-trailer truck 516, the location 512 of the semi-trailer truck 516, and the cargo status 514 of a particular semi-trailer truck 516, according to one embodiment.

Figure 6:
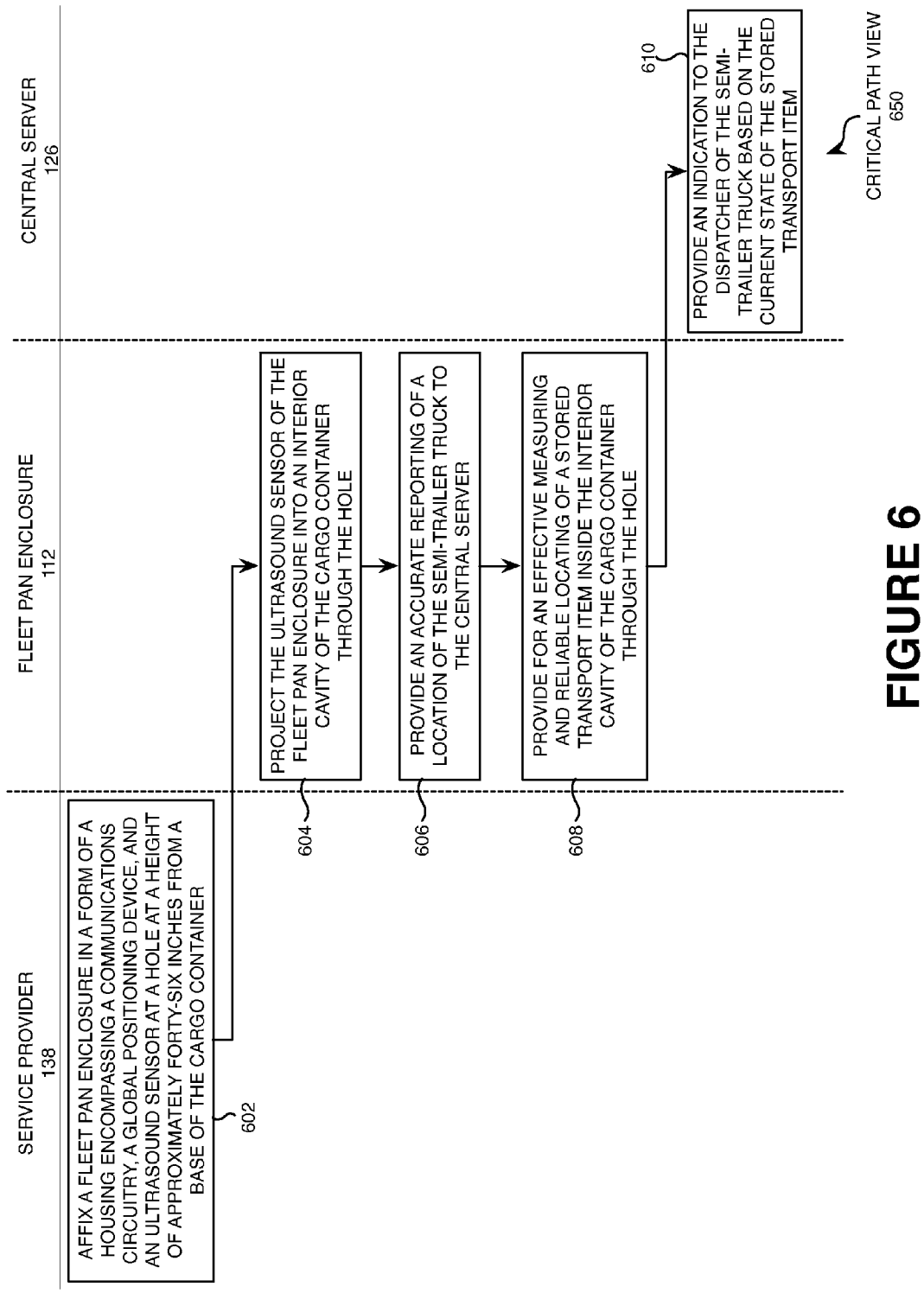
FIG. 6 is a critical path view illustrating a flow based on time in which critical operations of the fleet pan enclosure of the semi-trailer truck of FIG. 1 are established, according to one embodiment.

FIG. 6 is a critical path view 650 illustrating a flow based on time in which critical operations of the fleet pan enclosure 112 of the semi-trailer truck 104 of FIG. 1 are established, according to one embodiment. In operation 602, a service provider 138 affixes a fleet pan enclosure 112 in a form of a housing 114 encompassing a communications circuitry 116, a global positioning device 118, and an ultrasound sensor 120 at a hole 110 at a height of approximately forty-six inches from a base 108 of the cargo container 106. In operation 604, the fleet pan enclosure 112 projects the ultrasound sensor 120 of into an interior cavity 122 of the cargo container 106 through the hole 110. In operation 606, the fleet pan enclosure 112 provides an accurate reporting of a location of the semi-trailer truck 104 to the central server 126. In operation 608, the fleet pan enclosure 112 provides for an effective measuring and reliable locating of a stored transport item inside the interior cavity 122 of the cargo container 106 through the hole 110. In operation 610, the central server 126 provides an indication to the dispatcher of the semi-trailer truck 104 based on the current state of the stored transport item 136, according to one embodiment.

Figure 7:
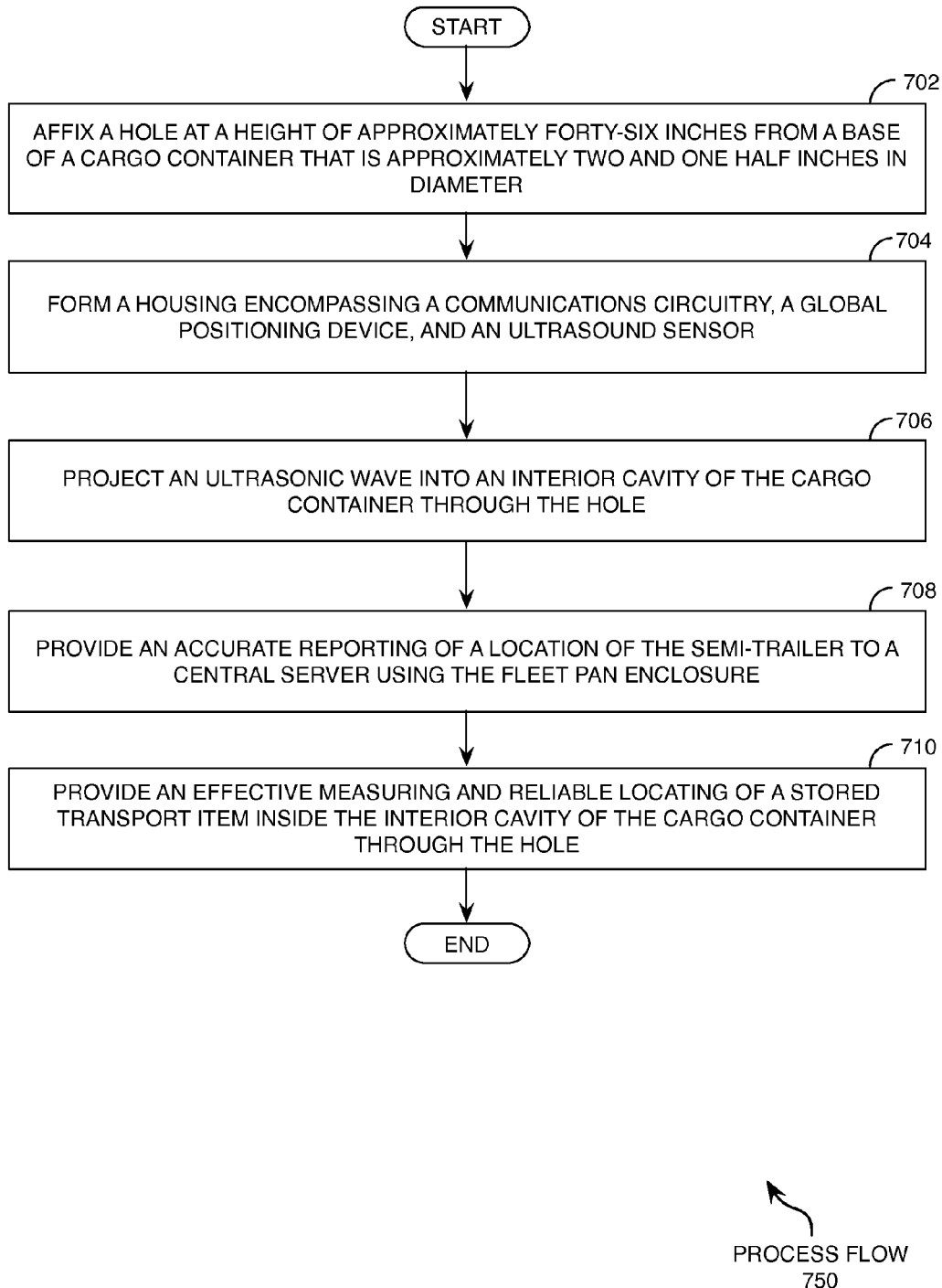
FIG. 7 is a process flow diagram of the fleet pan enclosure of the semi-trailer truck of FIG. 1, according to one embodiment.

FIG. 7 is a process flow diagram 750 of the fleet pan enclosure 112 of the semi-trailer truck 104 of FIG. 1, according to one embodiment. In operation 702, a hole 110 at a height of approximately forty-six inches from a base 108 of a cargo container 106 that is approximately two and one half inches in diameter may be affixed. In operation 704, a housing 114 encompassing a communications circuitry 116, a global positioning device 118, and an ultrasound sensor 120 may be formed. In operation 706, an ultrasonic wave may be projected into an interior cavity 122 of the cargo container 106 through the hole 110. In operation 708, an accurate reporting of a location of the semi-trailer 102 may be provided to a central server 126 by using the fleet pan enclosure 112. In operation 710, an effective measuring and reliable locating of a stored transport item 136 inside the interior cavity 122 of the cargo container 106 through the hole 110 may be provided, according to one embodiment.

Figure 8:
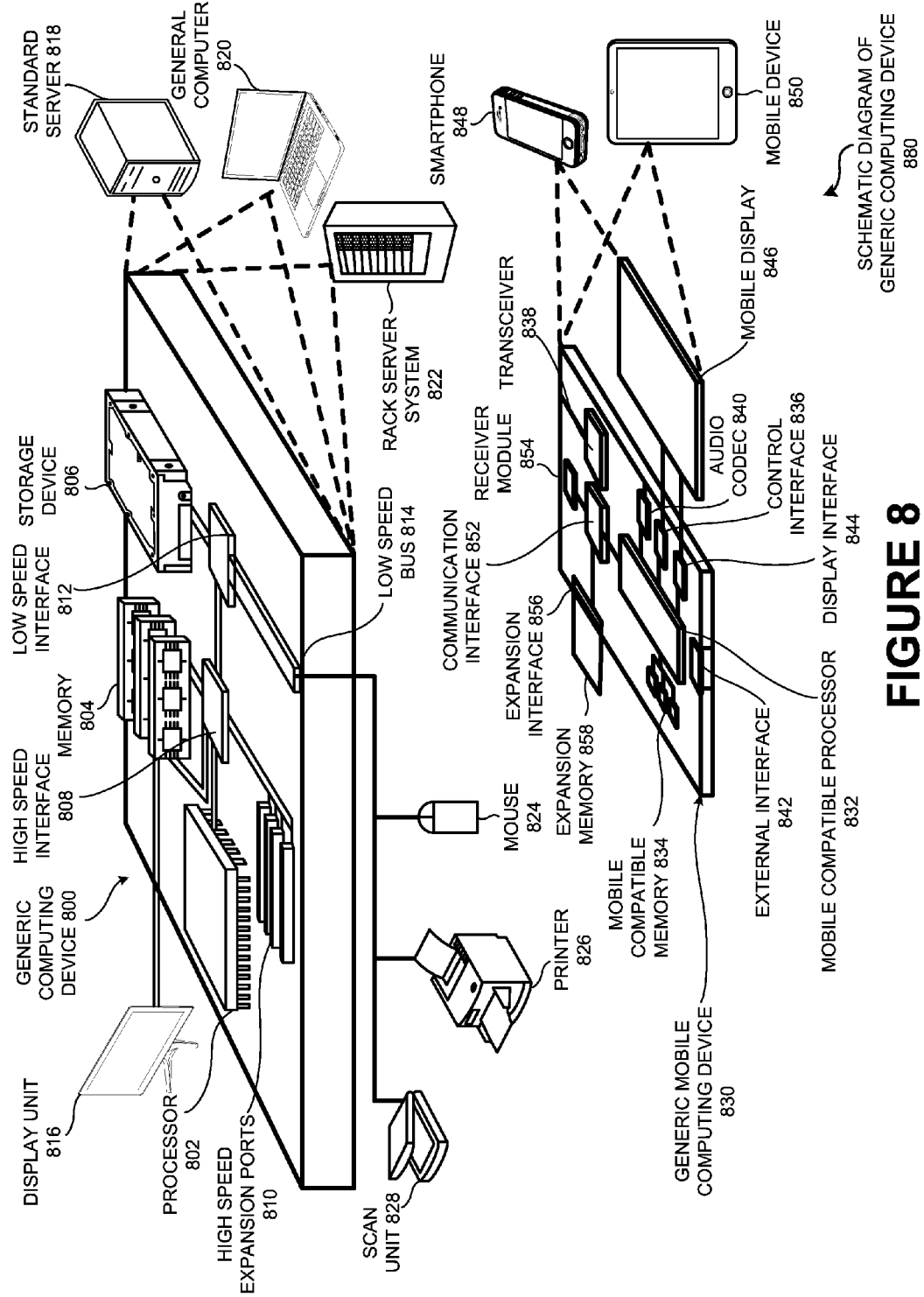
FIG. 8 is a schematic diagram of exemplary data processing devices that can be used to implement the methods and systems disclosed herein, according to one embodiment.

FIG. 8 is a schematic diagram of generic computing device 880 that can be used to implement the methods and systems disclosed herein, according to one or more embodiments. FIG. 8 is a schematic diagram of generic computing device 880 and a mobile device 850 that can be used to perform and/or implement any of the embodiments disclosed herein. In one or more embodiments, mobile communication device and/or user device 140 of FIG. 1 may be the generic computing device 800.

The generic computing device 800 may represent various forms of digital computers, such as laptops, desktops, workstations, personal digital assistants, servers, blade servers, mainframes, and/or other appropriate computers. The mobile device 850 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The generic computing device 800 may include a processor 802, a memory 804, a storage device 806, a high speed interface 808 coupled to the memory 804 and a plurality of high speed expansion ports 810, and a low speed interface 812 coupled to a low speed bus 814 and a storage device 806. In one embodiment, each of the components heretofore may be inter-coupled using various buses, and may be mounted on a common motherboard and/or in other manners as appropriate. The processor 802 may process instructions for execution in the generic computing device 800, including instructions stored in the memory 804 and/or on the storage device 806 to display a graphical information for a GUI on an external input/output device, such as a display unit 816 coupled to the high speed interface 808.

In other embodiments, multiple processors and/or multiple buses may be used, as appropriate, along with multiple memories and/or types of memory. Also, a plurality of computing device 800 may be coupled with, with each device providing portions of the necessary operations (e.g., as a server bank, a group of blade servers, and/or a multi-processor system).

The memory 804 may be coupled to the generic computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the generic computing device 800. In one embodiment, the storage device 806 may be includes a floppy disk device, a hard disk device, an optical disk device, a tape device, a flash memory and/or other similar solid state memory device. In another embodiment, the storage device 806 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 804, the storage device 806, a memory coupled to the processor 802, and/or a propagated signal.

The high speed interface 808 may manage bandwidth-intensive operations for the generic computing device 800, while the low speed interface 812 may manage lower bandwidth-intensive operations. Such allocation of functions is exemplary only. In one embodiment, the high speed interface 808 may be coupled to the memory 804, the display unit 816 (e.g., through a graphics processor and/or an accelerator), and to the plurality of high speed expansion ports 810, which may accept various expansion cards.

In the embodiment, the low speed interface 812 may be coupled to the storage device 806 and the low speed bus 814. The low speed bus 814 may be comprised of a wired and/or wireless communication port (e.g., a Universal Serial Bus ("USB"), a Bluetooth® port, an Ethernet port, and/or a wireless Ethernet port). The low speed bus 814 may also be coupled to the scan unit 828, a printer 826, a keyboard, a mouse 824, and a networking device (e.g., a switch and/or a router) through a network adapter.

The generic computing device 800 may be implemented in a number of different forms, as shown in the figure. In one embodiment, the computing device 800 may be implemented as a standard server 818 and/or a group of such servers. In another embodiment, the generic computing device 800 may be implemented as part of a rack server system 822. In yet another embodiment, the generic computing device 800 may be implemented as a general computer 820 such as a laptop or desktop computer. Alternatively, a component from the generic computing device 800 may be combined with another component in a mobile device 850. In one or more embodiments, an entire system may be made up of a plurality of generic computing device 800 and/or a plurality of generic computing device 800 coupled to a plurality of mobile device 850.

In one embodiment, the mobile device 850 may include a mobile compatible processor 832, a mobile compatible memory 834, and an input/output device such as a mobile display 846, a communication interface 852, and a transceiver 838, among other components. The mobile device 850 may also be provided with a storage device, such as a microdrive or other device, to provide additional storage. In one embodiment, the components indicated heretofore are inter-coupled using various buses, and several of the components may be mounted on a common motherboard.

The mobile compatible processor 832 may execute instructions in the mobile device 850, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the mobile device 850, such as control of user interfaces, applications run by the mobile device 850, and wireless communication by the mobile device 850.

The mobile compatible processor 832 may communicate with a user through the control interface 836 and the display interface 844 coupled to a mobile display 846. In one embodiment, the mobile display 846 may be a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832.

In addition, an external interface 842 may be provide in communication with the mobile compatible processor 832, so as to enable near area communication of the mobile device 850 with other devices. External interface 842 may provide, for example, for wired communication in some embodiments, or for wireless communication in other embodiments, and multiple interfaces may also be used.

The mobile compatible memory 834 may be coupled to the mobile device 850. The mobile compatible memory 834 may be implemented as a volatile memory and a non-volatile memory. The expansion memory 858 may also be coupled to the mobile device 850 through the expansion interface 856, which may comprise, for example, a Single In Line Memory Module ("SIMM") card interface. The expansion memory 858 may provide extra storage space for the mobile device 850, or may also store an application or other information for the mobile device 850.

Specifically, the expansion memory 858 may comprise instructions to carry out the processes described above. The expansion memory 858 may also comprise secure information. For example, the expansion memory 858 may be provided as a security module for the mobile device 850, and may be programmed with instructions that permit secure use of the mobile device 850. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 834, the expansion memory 858, a memory coupled to the mobile compatible processor 832, and a propagated signal that may be received, for example, over the transceiver 838 and/or the external interface 842.

The mobile device 850 may communicate wirelessly through the communication interface 852, which may be comprised of a digital signal processing circuitry. The communication interface 852 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 838 (e.g., radio-frequency transceiver). In addition, short-range communication may occur, such as using a Bluetooth®, Wi-Fi, and/or other such transceiver. In addition, a GPS ("Global Positioning System") receiver module 854 may provide additional navigation-related and location-related wireless data to the mobile device 850, which may be used as appropriate by a software application running on the mobile device 850.

The mobile device 850 may also communicate audibly using an audio codec 840, which may receive spoken information from a user and convert it to usable digital information. The audio codec 840 may likewise generate audible sound for a user, such as through a speaker (e.g., in a handset of the mobile device 850). Such a sound may comprise a sound from a voice telephone call, a recorded sound (e.g., a voice message, a music files, etc.) and may also include a sound generated by an application operating on the mobile device 850.

The mobile device 850 may be implemented in a number of different forms, as shown in the figure. In one embodiment, the mobile device 850 may be implemented as a smartphone 848. In another embodiment, the mobile device 850 may be implemented as a personal digital assistant ("PDA"). In yet another embodiment, the mobile device, 850 may be implemented as a tablet device.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and one output device.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system includes programmable processor, which may be special or general purpose, coupled to receive data and instructions from, and to transmit data and instructions to, a storage system, input device, and output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 824 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

An example embodiment will now be described. The ACME Freightage Inc. may provide the transportation services in remote areas of the United States. ACME Freightage may deal with varied categories of small and medium size businesses. The ACME Freightage Inc. may be compensated based on available room inside of a cargo area of a trailer of the transportation vehicle (e.g., a semi-trailer truck). The ACME Freightage Inc. may have employed sensors (e.g. weight sensors, wave sensors) in the interior spaces of the cargo area of its trailer of the transportation vehicles. The ACME Freightage Inc. may have later found that these sensors were inefficient in accurately measuring the inventory levels in its trailer due to restricted penetration of its sensory waves. In addition to this, these sensors may be occupying the interior space of the cargo area reducing the available space for the transportation of goods. Due to incorrect information of the available space, the ACME Freightage Inc. may be unable to adequately service its varied range of customer requests and may need to turn down work resulting into loss of revenue.

To address its undermining losses, the ACME Freightage Inc. may have decided to invest in embodiments described herein (e.g., use of various embodiments of the FIGS. 1-8) for optimum utilization of interior spaces of the cargo area of its trailers. The use of technologies described in various embodiments of the FIGS. 1-8 enabled the fleet managers of ACME Freightage Inc. to remotely monitor and manage not only their employees (e.g., driver 320), but also its entire fleets of vehicles and asset utilization in real-time. The various embodiments of the FIGS. 1-8 may have also provided the ACME Freightage Inc. the ability to an easy-to-use mobile interface, giving it real-time visibility into their daily operations along with helping fleet managers to automate manual business processes and optimize performance by providing a rich data platform for maximizing trailer utilization.

The use of technologies described in various embodiments of the FIGS. 1-8 may have enabled trailer management system of the ACME Freightage Inc to instantly connect trailer fleet managers to a host of powerful, easy-to-use analytics and insights via web-based, highly intuitive fleet tracking dashboards, customizable trailer tracking reports and exception-based alerts. Armed with this intelligence, fleet managers of the ACME Freightage Inc. may have the ability to automate yard checks; better manage and distribute trailer pools; improve detention billing; increase the efficiencies and productivity of dispatch operations; secure trailers and high-value cargo; deter fraud and unauthorized trailer use; improve driver and customer satisfaction; integrate with existing third-party trucking software; and maximize trailer utilization for a more profitable fleet. The ACME Freightage Inc. may now utilize their cargo area to its full capacity. This may have lead the ACME Freightage Inc. to save time, fuel, increase efficiency, customer satisfaction, and/or ultimately, prevent loss of revenue for its transportation services raising its profit.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A trailer of a semi-trailer truck, comprising:
   a cargo container having a hole with dimensions approximately two and one half inches in diameter, and the hole being located at a height of approximately forty-six inches from a base of the cargo container; and
   a fleet pan enclosure in a form of a housing encompassing a communications circuitry, a global positioning device and an ultrasound sensor to project into an interior cavity of the cargo container through the hole,
      wherein the global positioning device to provide an accurate reporting of a location of the semi-trailer truck to a central server,
      wherein an antenna of the communications circuitry is fully encompassed within the housing,
      wherein the location at which the housing is affixed provides for an effective measuring and reliable locating of a stored transport item inside the interior cavity of the cargo container through the hole,
      wherein an emitting face of the ultrasound sensor is tight-sealed to prevent moisture from entering an ultrasound sensor housing with a hydrophobic material, and
      wherein a risk of water damage to the ultrasound sensor is minimized through a tight-sealing of the emitting face of the ultrasound sensor.

2. The trailer of the semi-trailer truck of claim 1,
   wherein a low-ultrasound-attenuation material is utilized to produce a tight seal of an ultrasound sensor emitting face, and
   wherein an ultrasound wave emanating from the ultrasound sensor emitting face is permitted maximal penetration of such that the ultrasound wave is focusable in a manner that the ultrasound wave accurately measures a height of the stored transport item in a storage location of the interior cavity of the trailer to optimize asset planning and managing of the stored transport item.

3. The trailer of the semi-trailer truck of claim 2,
   wherein the low-ultrasound-attenuation material is shaped to produce a cast acoustic emitting face with a curvature such that a shape of a wave-front of the ultrasound wave produced by the ultrasound sensor is focused on a desired point, and
   wherein an accuracy of the measurement of the height of the stored transport item maximized in the storage location of the interior cavity of the trailer to optimize asset planning and managing of the stored transport item.

4. The trailer of the semi-trailer truck of claim 3,
   wherein a current state of a transport item is determined to be at least one of a loaded state, a partially loaded state, and an empty state based on a reading of an ultrasonic sensor, and
   wherein a compliance of a driver of a motorized cabin is audited based on a communication between the central server and the communication circuitry within the fleet pan enclosure.

5. The trailer of the semi-trailer truck of claim 3 wherein the fleet pan enclosure is created from a LEXAN polycarbonate offering impact resistance, dimensional stability and signal clarity such that the antenna of the communication circuitry to communicate externally with the central server while still being fully encompassed within the housing.

6. An apparatus, comprising:
   a housing encompassing a communication circuitry, a global positioning device and an ultrasound sensor affixed on a vertical face of an exterior front surface of a trailer toward a driver cabin of a semi-trailer truck,
      wherein the global positioning device to provide an accurate reporting of a location of the semi-trailer truck to a central server,
      wherein an antenna of the communications circuitry is fully encompassed within the housing,
      wherein the ultrasound sensor peers inside an interior cavity of the trailer through a hole formed on the vertical face between the housing and the interior cavity,
      wherein the location at which the housing is affixed provides for an effective measuring and reliable locating of a stored transport item through the hole,
      wherein an emitting face of the ultrasound sensor is tight-sealed to prevent moisture from entering an ultrasound sensor housing with a hydrophobic material, and
      wherein a risk of water damage to the ultrasound sensor is minimized through a tight-sealing of the emitting face of the ultrasound sensor.

7. The apparatus of claim 6,
   wherein a low-ultrasound-attenuation material is utilized to produce a tight seal of an ultrasound sensor emitting face; and
   wherein an ultrasound wave emanating from the ultrasound sensor emitting face is permitted maximal penetration of such that the ultrasound wave is focusable in a manner that the ultrasound wave accurately measures a height of the stored transport item in a storage location of the interior cavity of the trailer to optimize asset planning and managing of the stored transport item.

8. The apparatus of claim 7,
wherein the low-ultrasound-attenuation material is shaped to produce a cast acoustic emitting face with a curvature such that a shape of a wave-front of the ultrasound wave produced by the ultrasound sensor is focused on a desired point, and
wherein an accuracy of the measurement of the height of the stored transport item maximized in the storage location of the interior cavity of the trailer to optimize asset planning and managing of the stored transport item.

9. The apparatus claim 8,
wherein a current state of a transport item is determined to be at least one of a loaded state, a partially loaded state, and an empty state based on a reading of an ultrasonic sensor, and
wherein a compliance of a driver of a motorized cabin is audited based on a communication between a base terminal and the communication circuitry within the housing.

10. The apparatus claim 9 wherein a fleet pan enclosure is created from a LEXAN polycarbonate offering impact resistance, dimensional stability and signal clarity such that the antenna of the communication circuitry to communicate externally with the central server while still being fully encompassed within the housing.

11. A cargo container, comprising:
a fleet pan enclosure in a form of a housing encompassing a communications circuitry, a global positioning device and an ultrasound sensor to project into an interior cavity of the cargo container through a hole,
wherein the cargo container having a hole with dimensions approximately two and a half inches in diameter, and the hole being located at a height of approximately forty-six inches from a base of the cargo container,
wherein the global positioning device to provide an accurate reporting of a location of a semi-trailer truck to a central server,
wherein an antenna of the communications circuitry is fully encompassed within the housing,
wherein the location at which the housing is affixed provides for an effective measuring and reliable locating of a stored transport item inside the interior cavity of the cargo container through the hole,
wherein an emitting face of the ultrasound sensor is tight-sealed to prevent moisture from entering an ultrasound sensor housing with a hydrophobic material, and
wherein a risk of water damage to the ultrasound sensor is minimized through a tight-sealing of the emitting face of the ultrasound sensor.

12. A cargo container, comprising:
a fleet pan enclosure in a form of a housing encompassing a communications circuitry, a global positioning device and an ultrasound sensor to project into an interior cavity of the cargo container through a hole,
wherein the cargo container having a hole with dimensions approximately two and a half inches in diameter, and the hole being located at a height of approximately forty-six inches from a base of the cargo container,
wherein the global positioning device to provide an accurate reporting of a location of a semi-trailer truck to a central server,
wherein an antenna of the communications circuitry is fully encompassed within the housing,
wherein the location at which the housing is affixed provides for an effective measuring and reliable locating of a stored transport item inside the interior cavity of the cargo container through the hole, and
wherein a low-ultrasound-attenuation material is utilized to produce a tight seal of an ultrasound sensor emitting face.

13. The cargo container of claim 12,
wherein an ultrasound wave emanating from the ultrasound sensor emitting face is permitted maximal penetration of such that the ultrasound wave is focusable in a manner that the ultrasound wave accurately measures a height of the stored transport item in a storage location of the interior cavity of a trailer to optimize asset planning and managing of the stored transport item.

14. The cargo container of claim 13,
wherein a current state of a transport item is determined to be at least one of a loaded state, a partially loaded state, and an empty state based on a reading of an ultrasonic sensor.

15. The cargo container of claim 13,
wherein a compliance of a driver of a motorized cabin is audited based on a communication between the central server and the communication circuitry within the fleet pan enclosure.

16. The cargo container of claim 13,
wherein the fleet pan enclosure is created from a LEXAN polycarbonate offering impact resistance, dimensional stability and signal clarity such that the antenna of the communication circuitry to communicate externally with the central server while still being fully encompassed within the housing.

17. The cargo container of claim 12,
wherein the low-ultrasound-attenuation material is shaped to produce a cast acoustic emitting face with a curvature such that a shape of a wave-front of the ultrasound wave produced by the ultrasound sensor is focused on a desired point, and
wherein an accuracy of the measurement of the height of the stored transport item maximized in the storage location of the interior cavity of the trailer to optimize asset planning and managing of the stored transport item.

* * * * *